United States Patent
Terui

(10) Patent No.: US 10,341,727 B2
(45) Date of Patent: Jul. 2, 2019

(54) INFORMATION PROCESSING APPARATUS, INFORMATION PROCESSING METHOD, AND INFORMATION PROCESSING PROGRAM

(71) Applicant: Rakuten, Inc., Tokyo (JP)

(72) Inventor: Shingo Terui, Tokyo (JP)

(73) Assignee: Rakuten, Inc., Setaguya-ku, Tokyo (JP)

( * ) Notice: Subject to any disclaimer, the term of this patent is extended or adjusted under 35 U.S.C. 154(b) by 0 days.

(21) Appl. No.: 14/392,146

(22) PCT Filed: Jun. 28, 2013

(86) PCT No.: PCT/JP2013/067837
§ 371 (c)(1),
(2) Date: Dec. 23, 2015

(87) PCT Pub. No.: WO2014/207903
PCT Pub. Date: Dec. 31, 2014

(65) Prior Publication Data
US 2016/0142773 A1    May 19, 2016

(51) Int. Cl.
*H04H 60/32*    (2008.01)
*H04N 21/466*    (2011.01)
(Continued)

(52) U.S. Cl.
CPC ......... *H04N 21/4667* (2013.01); *G06F 16/40* (2019.01); *H04N 21/2387* (2013.01);
(Continued)

(58) Field of Classification Search
None
See application file for complete search history.

(56) References Cited

U.S. PATENT DOCUMENTS

2004/0045020 A1* 3/2004 Witt .................. H04N 7/163
                                                        725/13
2004/0107207 A1* 6/2004 Kondo ............... H04N 5/44582
(Continued)

FOREIGN PATENT DOCUMENTS

JP    7-141398 A    6/1995
JP    2006-4409 A    1/2006
(Continued)

OTHER PUBLICATIONS

International Search Report for PCT/JP2013/067837 dated Nov. 19, 2013.

*Primary Examiner* — Olugbenga O Idowu
(74) *Attorney, Agent, or Firm* — Sughrue Mion, PLLC

(57) ABSTRACT

It is an object of the present invention to allow for appropriate control of how to present content during presentation of the content. An information processing apparatus obtains content identification information. Storage means stores operation logs each of which includes both the time at which an operation to control presentation of content was performed during presentation of the content and details of the operation. The information processing apparatus retrieves operation logs corresponding to the obtained content identification information from the storage means. Based on the retrieved operation logs, a tendency of operation changes is identified. In accordance with the tendency, the information processing apparatus generates control information for controlling how to present content. The control information includes details of control and a timing of the control. The information processing apparatus provides the control information.

18 Claims, 22 Drawing Sheets

(51) Int. Cl.
*H04N 21/442* (2011.01)
*H04N 21/2387* (2011.01)
*H04N 21/258* (2011.01)
*H04N 21/472* (2011.01)
*G06F 16/40* (2019.01)
*H04N 21/439* (2011.01)
*H04N 21/44* (2011.01)
*H04N 21/488* (2011.01)

(52) U.S. Cl.
CPC . *H04N 21/25866* (2013.01); *H04N 21/44222* (2013.01); *H04N 21/47217* (2013.01); *H04N 21/439* (2013.01); *H04N 21/44* (2013.01); *H04N 21/4884* (2013.01)

(56) References Cited

U.S. PATENT DOCUMENTS

| | | | | |
|---|---|---|---|---|
| 2009/0055884 A1* | 2/2009 | Park | ............. | G11B 27/105 725/137 |
| 2009/0319901 A1* | 12/2009 | Johnson | ............. | H04N 7/163 715/722 |
| 2012/0278331 A1* | 11/2012 | Campbell | ............. | G06F 16/437 707/740 |
| 2014/0215341 A1* | 7/2014 | Fratti | ............. | G06F 16/4393 715/730 |

FOREIGN PATENT DOCUMENTS

| | | | |
|---|---|---|---|
| JP | 2006-330830 | A | 12/2006 |
| JP | 2009-200964 | A | 9/2009 |
| JP | 2011-155541 | A | 8/2011 |
| JP | 2011-217197 | A | 10/2011 |

* cited by examiner

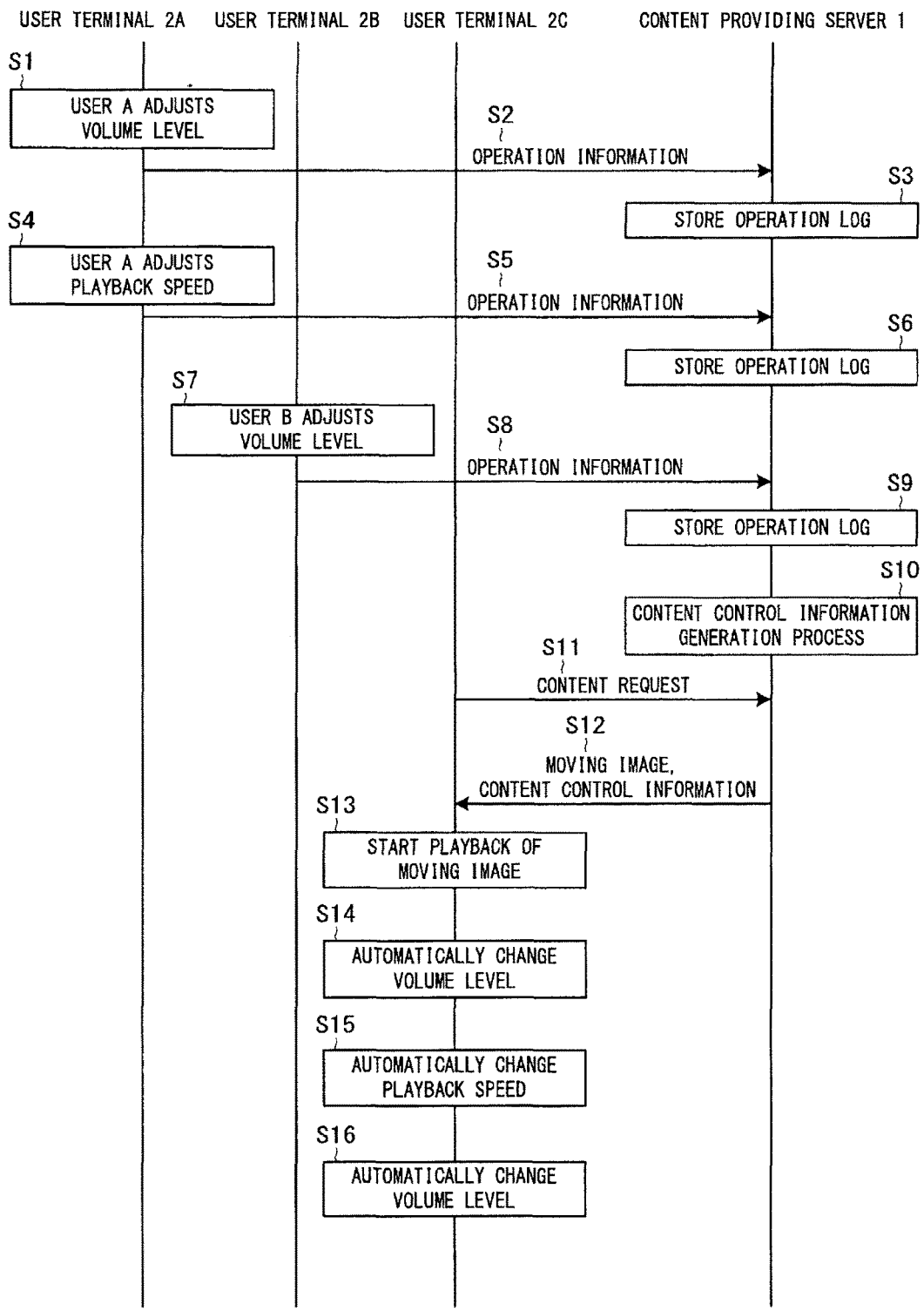

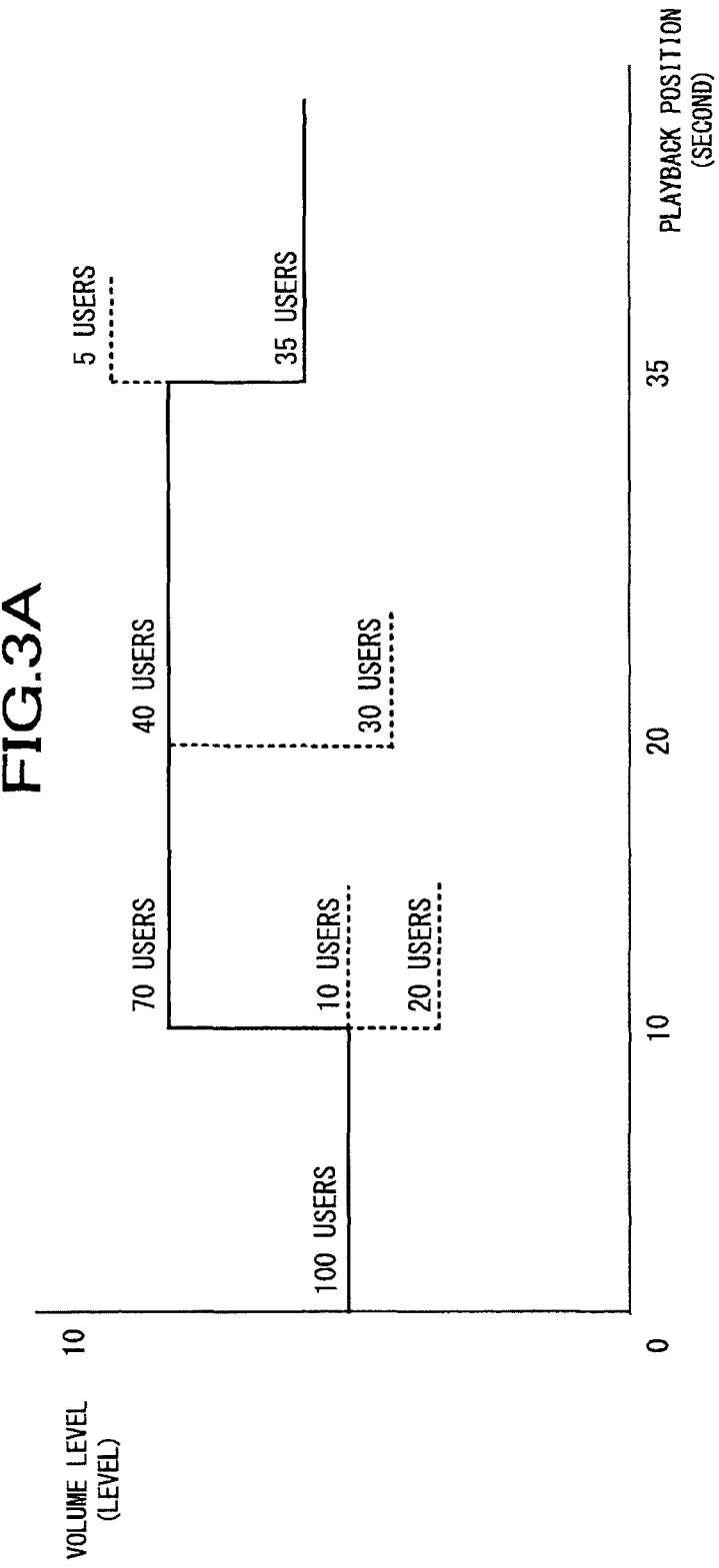

FIG.5A
MEMBER INFORMATION DB  12a

| USER ID |
|---|
| PASSWORD |
| NICKNAME |
| NAME |
| BIRTH DATE |
| GENDER |
| ZIP CODE |
| ADDRESS |
| TELEPHONE NUMBER |
| E-MAIL ADDRESS |

FIG.5B
CONTENT INFORMATION DB  12b

| CONTENT ID |
|---|
| MOVING IMAGE DATA |
| CONTENT CONTROL INFORMATION |
| ... |

FIG.5C
CONTENT CONTROL INFORMATION

| CONTENT ID |
|---|
| CONTROL RECORD |
| CONTROL RECORD |
| CONTROL RECORD |
| ... |

FIG.5D
CONTROL RECORD

| PLAYBACK POSITION |
|---|
| OPERATION ITEM ID |
| OPERATION DETAILS INFORMATION |

FIG.5E
OPERATION HISTORY DB  12c

| CONTENT ID |
|---|
| USER ID |
| OPERATION DATE AND TIME |
| PLAYBACK POSITION |
| OPERATION ITEM ID |
| OPERATION DETAILS INFORMATION |

FIG.19A
CONTENT INFORMATION DB — 12b

| CONTENT ID |
| --- |
| ELECTRONIC BOOK DATA |
| CONTENTS INFORMATION |
| PAGE INFORMATION |
| CONTENT CONTROL INFORMATION |
| . . . |

FIG.19B
CONTENT CONTROL INFORMATION

| CONTENT ID |
| --- |
| PAGE CONTROL RECORD |
| PAGE CONTROL RECORD |
| . . . |
| HIGHLIGHT CONTROL RECORD |
| HIGHLIGHT CONTROL RECORD |
| . . . |

FIG.19C
PAGE CONTROL RECORD

| DISPLAY ORDINAL NUMBER |
| --- |
| PAGE NUMBER |
| DISPLAY TIME |

FIG.19D
HIGHLIGHT CONTROL RECORD

| PAGE NUMBER |
| --- |
| IN-PAGE POSITION INFORMATION |
| HIGHLIGHT CHARACTERS |

FIG.19E
OPERATION HISTORY DB — 12c

| CONTENT ID |
| --- |
| USER ID |
| OPERATION DATE AND TIME |
| OPERATION ITEM ID |
| OPERATION DETAILS INFORMATION |

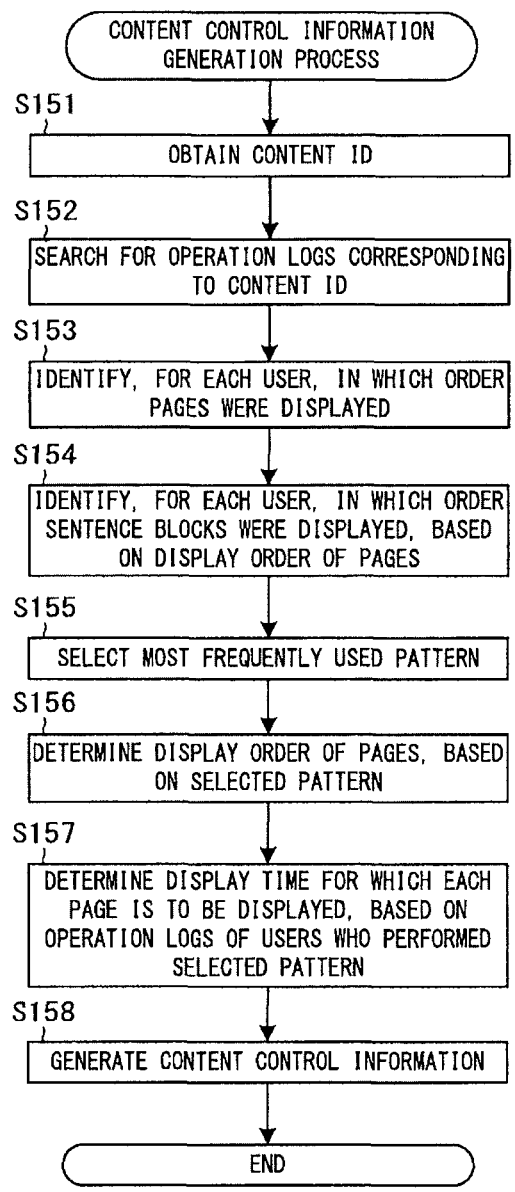

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2013/067837 filed Jun. 28, 2013, the contents of all of which are incorporated herein by reference in their entirety.

TECHNICAL FIELD

The present invention relates to techniques for automatically controlling how to present content.

BACKGROUND ART

Techniques for automatically controlling how to present content depending on the content are conventionally known. For example, Patent Literature 1 discloses a technique for storing the volume level changed by a user during playback of an input source and for resuming the playback of the input source at the stored volume level after playback of another input source.

CITATION LIST

Patent Literature

Patent Literature 1: JP 2011-155541 A

SUMMARY OF INVENTION

Technical Problem

However, the technique described in Patent Literature 1 merely resumes the playback of the input source at the volume level set last. The technique described in Patent Literature 1 does not reflect, during playback of one input source, changes in its image and sound with time. Thus, while the input source is being played back, a user has to adjust the volume level as needed depending on its image and sound.

In view of the above point, it is an object of the present invention to provide an information processing apparatus, an information processing method, and an information processing program that can appropriately control how to present content during presentation of the content.

Solution to Problem

To solve the above problem, the invention according to claim 1 is an information processing apparatus that includes content identification information obtaining means, log retrieval means, generating means, and providing means. The content identification information obtaining means obtains content identification information for identifying content to be presented. Storage means stores operation logs including both the time at which an operation to control presentation of content was performed during presentation of content and details of an operation in association with the content identification information. The log retrieval means retrieves, from the storage means, the operation logs corresponding to the content identification information obtained by the content identification information obtaining means. Based on the operation logs retrieved by the log retrieval means, a tendency of operation changes is identified. In accordance with the tendency, the generating means generates control information for controlling how to present content. The control information includes details of control and a timing of the control. The providing means provides the control information generated by the generating means.

According to this invention, how to present content can be controlled, based on details of control and on a timing of the control that are included in control information generated in accordance with how operations tend to change. Thus, how to present content during presentation of the content can be controlled appropriately.

The invention according to claim 2 is the information processing apparatus according to claim 1 in which, based on the frequency of appearance of each of one or more patterns into which at least one of the changes identified based on the operation logs are divided, the generating means selects at least one of the patterns and generates the control information in accordance with the selected pattern.

According to this invention, control information is generated in accordance with a pattern selected from among patterns of operation changes, based on their frequencies of appearance. This allows for control using appropriate control information.

The invention according to claim 3 is the information processing apparatus according to claim 2 in which the providing means provides the control information generated in accordance with a first pattern among a plurality of the patterns identified from the operation logs. The information processing apparatus further includes operation information obtaining means. When an operation to control presentation of content is performed while presentation of content is being automatically controlled in accordance with the control information provided by the providing means, the operation information obtaining means obtains operation information including both the time at which an operation is performed and details of an operation. The providing means provides the control information generated in accordance with a second pattern that matches an operation indicated by the operation information obtained by the operation information obtaining means, among the patterns different from the first pattern.

According to this invention, when an operation to control presentation of content is performed while the presentation of the content is being automatically controlled in accordance with one of a plurality of pieces of control information, the control information used for automatically controlling the presentation of the content is changed to control information that matches the operation just performed. Consequently, presentation can be controlled appropriately depending on an actual operation.

The invention according to claim 4 is the information processing apparatus according to claim 2 or 3 further including user identification information obtaining means, second log retrieval means, and identifying means. The user identification information obtaining means obtains user identification information for identifying a first user to whom content is presented. The storage means stores the operation logs, the content identification information and user identification information identifying a user who performed an operation in association with each other. The second log retrieval means retrieves, from the storage means, the operation logs corresponding to the content identification information different from the content identification information obtained by the content identification information obtaining means. Based on the operation logs retrieved by the second log retrieval means, the identifying means identifies second users whose operation changes are similar to the operation changes of the first user, from among second users different from the first user identified by the user identification information obtained by the user identification information obtaining means. The providing means provides the control information generated by the generating means in accordance with a pattern including the largest percentage of operation changes by the second users identified by the identifying means, among a plurality of the patterns identified from the operation logs.

According to this invention, for content different from content presented to a user, users whose operation changes are similar to those of the user are identified. Then, control information corresponding to a pattern that includes the largest percentage of the operation changes by the identified users, among a plurality of pieces of control information corresponding to the presented content is provided. Thus, even when content that is about to be presented to a user has never been presented to the user, control information that suits the user can be provided.

The invention according to claim 5 is the information processing apparatus according to any one of claims 1 to 4 in which the log retrieval means retrieves the operation logs including the time at which a volume level change operation on content containing sounds was performed, and the generating means sets a volume level change timing to the output start time of the sound output first among sounds output at a volume level changed by the change operation.

According to this invention, the volume level is changed when a sound output starts. Thus, the volume level can be changed at a timing that a user is likely to desire.

The invention according to claim 6 is the information processing apparatus according to any one of claims 1 to 5 in which the log retrieval means retrieves the operation logs including the time of a playback speed change operation on content to be played back, and the generating means sets a playback speed change timing to the time corresponding to an edit point before or after the time of a playback speed change operation.

According to this invention, the playback speed is changed at an edit point in content. Thus, the playback speed can be changed at a timing that a user is likely to desire.

The invention according to claim 7 is the information processing apparatus according to claim 6 in which the log retrieval means further retrieves the operation logs including both the time of a temporal playback position move operation on content and information indicating in which direction a playback position was moved, and when a playback position move operation is performed within a predetermined period of time after a playback speed change operation is performed, the generating means sets a playback speed change timing to the time corresponding to an edit point in the direction in which a playback position is moved, among edit points before and after the time of a playback speed change operation.

According to this invention, when a playback position move operation was performed within a predetermined period of time after a playback speed change operation, the playback speed is changed at an edit point in the direction in which the playback position was moved. Thus, the playback speed can be changed at a timing that a user is likely to desire.

The invention according to claim 8 is the information processing apparatus according to according to any one of claims 1 to 4, wherein the log retrieval means retrieves the operation logs including both a time at which a page switching operation on content having a plurality of pages was performed and information indicating a page that was displayed, and the generating means sets a page switching timing for each page, in accordance with a tendency of page switching time intervals.

According to this invention, each page can be switched at a timing that follows a tendency of page switching time intervals. Thus, each page can remain displayed for a duration of time appropriate for a user to view the page.

The invention according to claim 9 is the information processing apparatus according to claim 8 in which, when an operation to redisplay a page that was displayed before is performed while page switching is being performed in accordance with timings included in the control information provided by the providing means, the generating means changes a page switching timing so that a page switching time interval becomes longer than the time interval included in the control information provided before, and the providing means provides the control information including a page switching timing changed by the generating means.

According to this invention, when an operation to redisplay a page that was displayed before was performed while automatic page switching was being performed in accordance with control information, the timing of switching the page can be delayed. Thus, if a user who actually views content finds it early to switch a page, the page can be switched at a timing that suits the user.

The invention according to claim 10 is the information processing apparatus according to claim 9 in which, when the generating means changes a page switching timing, the more information a page contains, the longer time the generating means adds to the time interval.

According to this invention, depending on the amount of information contained in a page, the timing of switching the page can be delayed properly.

The invention according to claim 11 is the information processing apparatus according to any one of claims 1 to 4 and 8 to 10 in which the log retrieval means retrieves the operation logs that includes information indicating which pages in content having both a plurality of pages and a table of contents were displayed and that includes time at which each page was displayed, and the generating means identifies in which order a plurality of ranges, into which content is divided by referring to the table of contents, tend to be displayed, based on a tendency of the display order of pages, and generates the control information indicating an order in which a plurality of pages are to be displayed, in accordance with an identified tendency.

According to this invention, a plurality of pages can be displayed in an order that follows an order in which a plurality of ranges included in content tend to be displayed. Thus, the plurality of ranges can be displayed in an order that a user desires.

The invention according to claim 12 is the information processing apparatus according to any one of claims 1 to 4 and 8 to 11 in which the log retrieval means retrieves the operation logs including information indicating characters selected by a user in content containing a plurality of characters, and the generating means generates the control information for changing the display format of characters that tend to be selected.

According to this invention, characters that tend to be selected can become more visible.

The invention according to claim 13 is the information processing apparatus according to claim 12 further including character obtaining means and selecting user identification information retrieval means. When an operation to select any characters contained in content, the character obtaining means obtains information indicating selected characters. The storage means stores the content identification information and user identification information identifying a user who performed an operation in association with each other. The selecting user identification information retrieval means retrieves, from the storage means, the user identification information corresponding to the operation logs including information obtained by the character obtaining means. The log retrieval means retrieves the operation logs corresponding to the user identification information obtained by the selecting user identification information retrieval means, among the operation logs corresponding to the content identification information obtained by the content identification information obtaining means.

According to this invention, just when a user who is viewing content selects characters, the display format of characters that other users who selected the same characters have selected before can be changed. Thus, characters that are likely to interest the user can be noticed more easily.

The invention according to claim 14 is an information processing method performed by a computer. The method includes the following steps. Content identification information for identifying content to be presented is obtained. Storage means stores operation logs including both the time at which an operation to control presentation of content was performed during presentation of content and details of an operation in association with the content identification information. The operation logs corresponding to the obtained content identification information are retrieved from the storage means. Based on the retrieved operation logs, a tendency of operation changes is identified. In accordance with the tendency, control information for controlling how to present content is generated. The control information includes details of control and a timing of the control. The generated control information is provided.

The invention according to claim 15 is an information processing program that causes a computer to function as content identification information obtaining means, logs retrieval means, generating means, and providing means. The content identification information obtaining means obtains content identification information for identifying content to be presented. Storage means stores operation logs including both the time at which an operation to control presentation of content was performed during presentation of content and details of an operation in association with the content identification information. The log retrieval means retrieves, from the storage means, the operation logs corresponding to the content identification information obtained by the content identification information obtaining means. Based on the operation logs retrieved by the log retrieval means, a tendency of operation changes is identified. In accordance with the tendency, the generating means generates control information for controlling how to present content. The control information includes details of control and a timing of the control. The providing means provides the control information generated by the generating means.

Advantageous Effects of Invention

According to the present invention, how to present content can be controlled, based on details of control and on a timing of the control that are included in control information generated in accordance with how operations tend to change. Thus, how to present content during presentation of the content can be controlled appropriately.

BRIEF DESCRIPTION OF DRAWINGS

FIG. 2 is a sequence diagram showing an example overall process in the information processing system S according to this embodiment.

FIG. 3A is a graph showing changes in the volume level during playback of a moving image.

FIG. 3B is a diagram showing example information included in content control information.

FIG. 5A is a diagram showing example contents stored in a member information DB 12a.

FIG. 5B is a diagram showing example contents stored in a content information DB 12b.

FIG. 5C is a diagram showing example contents of the content control information.

FIG. 5D is a diagram showing example contents of a control record.

FIG. 5E is a diagram showing example contents stored in an operation history DB 12c.

FIG. 19A is a diagram showing example contents stored in the content information DB 12b.

FIG. 19B is a diagram showing example contents of the content control information.

FIG. 19C is a diagram showing example contents of a page control record.

FIG. 19D is a diagram showing example contents of a highlighting control record.

FIG. 19E is a diagram showing example contents stored in the operation history DB 12c.

FIG. 20 is a flowchart showing an example process of the content control information generation process in the system controller 14 of the content providing server 1 according to this embodiment.

DESCRIPTION OF EMBODIMENTS

The following describes embodiments of the present invention in detail with reference to the drawings. In the embodiments described below, the present invention is applied to an information providing system.

Figure 1:
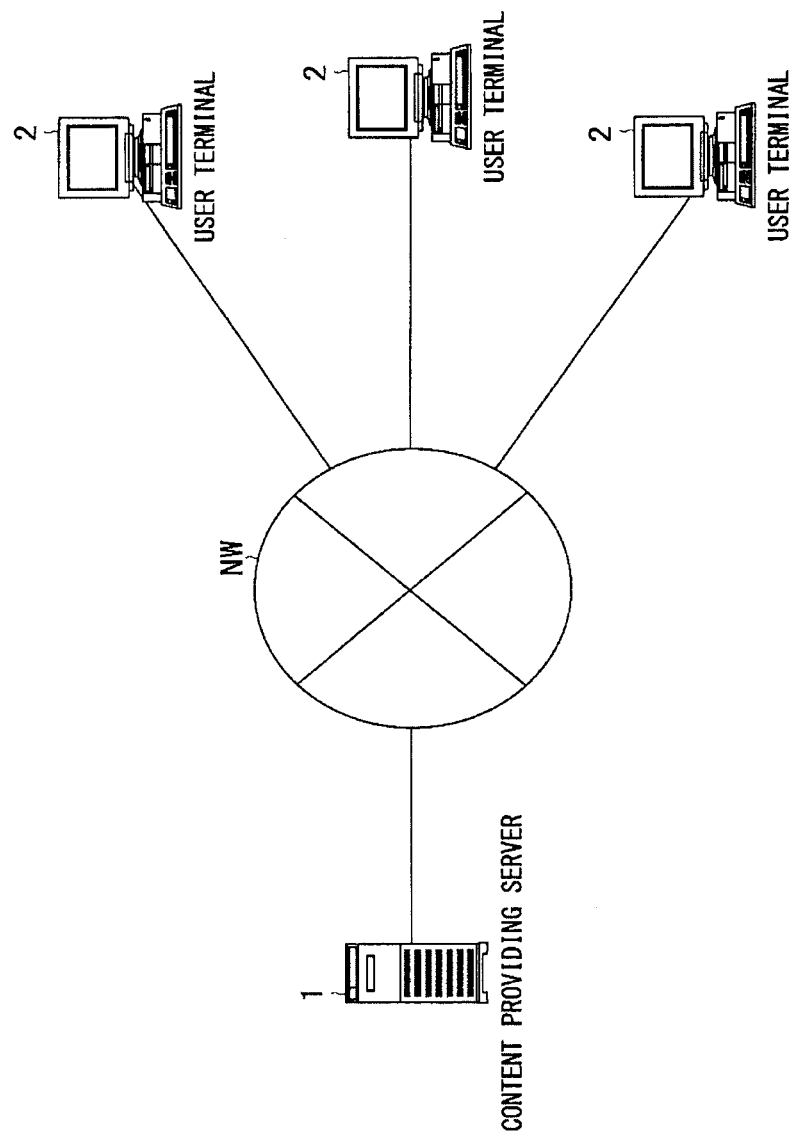
FIG. 1 is a diagram schematically showing an example configuration of an information providing system S according to this embodiment.

1. First Embodiment 1-1. Configuration and Functional Overview of Information Providing System A configuration of an information providing system S according to this embodiment is first described with reference to FIG. 1. FIG. 1 is a diagram schematically showing an example configuration of the information providing system S according to this embodiment.

As shown in FIG. 1, the information providing system S includes a content providing server 1 and a plurality of user terminals 2. The content providing server 1 can exchange data with each user terminal 2 over a network NW using communication protocols, such as TCP/IP. The network NW includes, for example, the Internet, a dedicated communication line (e.g., community antenna television (CATV) line), a mobile communication network (including base stations), and a gateway.

The content providing server 1 is a server device that provides content to the user terminal 2. For example, in this embodiment, moving images are delivered as the content. Each moving image contains sounds. The content providing server 1 may stream moving images or allow the user terminals 2 to download moving images.

The user terminal 2 is a terminal device of a user who watches or listens to content. In response to an operation by the user, the user terminal 2 receives desired content from the content providing server 1 and presents the content to the user. The user terminal 2 has software, such as a content presentation program, a browser, and an e-mail client, installed on it. The content presentation program is a program for presenting content. The content presentation program may be, for example, an add-on program for the browser or a dedicated application program. The content presentation program in this embodiment is a moving image player program. For example, a personal computer, a personal digital assistant (PDA), a portable information terminal such as a smartphone, or a mobile phone is used as the user terminal 2.

In this embodiment, while the user terminal 2 is playing back a moving image, the user can perform operations to control playback of the moving image. For example, a volume level change operation, a playback speed change operation, an operation to toggle between showing and hiding subtitles, a skip operation, and other operations are available. The volume level change operation, the playback speed change operation, and the operation to toggle the subtitle showing mode (between showing and hiding subtitles) are each referred to as a playback mode change operation. It can be burdensome for users to perform every such playback mode change operation during playback of a moving image. For this reason, it might be an option that the user terminal 2 or the content providing server 1 stores details of the last playback mode change operation performed during the previous playback of a moving image, and that the user terminal 2 automatically sets the volume level, the playback speed, and the subtitle showing mode based on the stored details when starting playback of the same moving image. However, during playback of the moving image, its image and sound output from the user terminal 2 change. Thus, depending on changes in the image and the sound, the user may sometimes wish to change the volume level, the playback speed, or the display of subtitles. In this case, the user has to perform a playback mode change operation. Also when the user plays back a moving image that the user watches for the first time, the automatic setting cannot work because no details are store for any playback mode change operation on the moving image.

For this reason, the content providing server 1 identifies how operations performed during presentation of content tend to change, based on operation logs of a plurality of users. Each operation log is a log of an operation performed during presentation of content. Operation changes are also changes of playback control details.

The content providing server 1 generates content control information in accordance with the identified tendency. The content control information is information for controlling how to present content. The content providing server 1 provides the content control information to the user terminal 2. The content providing server 1 thus causes the user terminal 2 to control playback of content in accordance with the content control information. It may be configured to allow the user to choose whether to control playback of the content in accordance with the content control information.

FIG. 2 is a sequence diagram showing an example overall process in the information processing system S according to this embodiment. As shown in FIG. 2, while a user terminal 2a is playing back a moving image C1, a user A performs, for example, a volume level change operation (Step S1). Then, the user terminal 2a sends operation information to the content providing server 1 (Step S2). The operation information is information about an operation. The operation information includes at least a content ID, the time at which the operation was performed, an operation item ID, and operation details information. The content ID is identification information of content being played back. The time at which the operation was performed may be, for example, the date and time or the playback position at which the operation was performed. The playback position is a time position, in a moving image, that corresponds to one of the frame images constituting the moving image. The playback position is indicated by the time that has elapsed since the moving image started to be played back. The operation item ID indicates an item that was operated. The operation details information is information indicating details of the operation. In this embodiment, the period during which content is being played back means the period from the start to the end of playback of a moving image. The content providing server 1 stores the operation information received from the user terminal 2a as an operation log (Step S3). The user terminal 2 may send the operation information at a time different from the time when the operation was performed. For example, the user terminal 2 may send pieces of operation information corresponding to operations that have been performed, all at once, at predetermined intervals or at the time when a predetermined number of operations have just been performed.

After that, for example, the user A performs a playback speed change operation (Step S4). Then, the user terminal 2a sends operation information to the content providing server 1 (Step S5). The content providing server 1 stores the received operation information as an operation log (Step S6). While a user terminal 2b is also playing back the moving image C1, a user B performs, for example, a volume level change operation (Step S7). Then, the user terminal 2b sends operation information to the content providing server 1 (Step S8). The content providing server 1 stores the received operation information as an operation log (Step S9).

The content providing server 1 performs a content control information generation process at a certain time (Step S10). In the content control information generation process, the content providing server 1 identifies how operations tend to change based on the operation logs, and generates content control information. The content control information includes an operation item ID, operation details information, a playback position, and other information. The operation item ID indicates an item to be controlled. The operation details information indicates details of the control. The playback position indicates when the control is to be performed. For example, the content providing server 1 may regularly perform the content control information generation process or may perform the content control information generation process for a moving image played back at the start or the end of playback of the moving image. The content control information generation process is described in detail below.

A user C performs an operation to play back the moving image C1 on a user terminal 2c. Then, the user terminal 2c sends a content request to the content providing server 1 (Step S11). The content providing server 1 sends the moving image C1 and the content control information in response to the content request (Step S12). The user terminal 2c starts playback of the received moving image C1 (Step S13). The user terminal 2c also controls how to play back the moving image C1, in accordance with the received content control information. For example, the user terminal 2c automatically changes the volume level at a certain playback position (Step S14). Subsequently, the user terminal 2c automatically changes the playback speed at a certain playback position (Step S15). After that, the user terminal 2c automatically changes the volume level at a certain playback position (Step S16).

The following describes a method for identifying how operations tend to change, using volume level change operations as an example. FIG. 3A is a graph showing changes in the volume level during playback of a moving image. Assume that a hundred users watched a moving image. Accordingly, operation logs of the hundred users are stored. The content providing server 1 identifies, from the operation logs, playback positions each of which at least one of the hundred users performed a volume level change operation at, in order of decreasing proximity to the start of playback of the moving image. For example, 10 seconds after the start of playback of the moving image, seventy users turned up the volume level from Level 5 to Level 8. At the same time, twenty users turned down the volume level from Level 5 to Level 3. Ten users did not change the volume level. Assuming for convenience that keeping the volume level unchanged is also treated as a playback control operation, there are three types of operations. The content providing server 1 identifies, as a majority, the users who performed the most frequent operation at each identified playback position. In the example of FIG. 3B, the most frequent operation 10 seconds after the start is the operation to turn up the volume level from Level 5 to Level 8.

After identifying a majority at a certain playback position, the content providing server 1 identifies at which playback position the majority users performed volume level change operations next. Then, the content providing server 1 identifies the users who performed the most frequent operation at the identified playback position as the majority at the playback position. For example, 20 seconds after the start of playback of the moving image, thirty of the seventy users turned down the volume level from Level 8 to Level 4. At the same time, forty of the seventy users did not change the volume level. Thus, the most frequent operation is the operation to keep the volume level unchanged. After that, 35 seconds after the start of playback of the moving image, five of the forty users turned up the volume level from Level 8 to Level 9. At the same time, thirty five of the forty users turned down the volume level from Level 8 to Level 6. Thus, the most frequent operation is the operation to turn down the volume level from Level 8 to Level 6. The content providing server 1 identifies what operation each majority performed, from the start to the end of playback of the moving image. The solid line graph shown in FIG. 3 indicates how the operations identified in the manner described above tend to change.

FIG. 3B is a diagram showing example information included in the content control information. To generate content control information, the content providing server 1 determines, for each of the identified playback positions, details of the operation that tends to be performed at the playback position as control details. For a volume level change operation, for example, a volume level change direction and a volume level are determined as its control details. The volume level change direction is set to "up" or "down". In the example of FIG. 3A, for the playback position "10 seconds", the volume level change direction is set to "up" and the volume level is set to "Level 8". Also, for the playback position "35 seconds", the volume level change direction is set to "down" and the volume level is set to "Level 6". For a playback position at which the volume level was not changed, no control details need be set. The content providing server 1 generates content control information that includes the identified positions and the determined control details.

The user terminal 2 changes the volume level to Level 8 ten seconds after the start of playback of the moving image, by referring to the content control information. Twenty five seconds after that, the user terminal 2 changes the volume level to Level 6.

In the example of FIG. 3A, the volume level at the start of playback of the moving image is Level 5 for all the users. That is, the initial volume level is Level 5. However, the initial volume level may depend on the user terminal 2 used by each user. For example, some user terminals 2 allow users to set the initial volume level. In other cases, the moving image player program is designed to set the initial volume level of a moving image played this time to the volume level at the end of playback of the previous moving image. For this reason, the content providing server 1 may identify how volume level change operations tend to change, based on relative changes in the volume level. The content providing server 1 may identify how volume level change operations tend to change, for example, based on a post-change volume level after each volume level change operation relative to a pre-change volume level before the change operation. A volume level expressed relatively is referred to as a relative volume level. The relative volume level is the difference between the pre-change volume level and the post-change volume level. When the volume level is turned up, the relative volume level has a positive value. When the volume level is turned down, the relative volume level has a negative value. For example, when the user A changes the volume level from an initial value of Level 5 to Level 8, the relative volume level is +3. When the user B changes the volume level from an initial value of Level 8 to Level 11, the relative volume level is +3. In this case, the operation details of the user A and the operation details of the user B are the same. When the user C changes the volume level from an initial value of Level 5 to Level 11, the relative volume level is +6. In this case, the operation details of the user A and the operation details of the user C are different. The operation details of the user B and the operation details of the user C are also different. When a user D changes the volume level from an initial value of Level 9 to Level 8, the relative volume level is −1. In this case, the operation details of the user A and the operation details of the user D are different.

FIG. 3A shows simplified each user's operation changes. Even a plurality of users who seem to have performed operations in the same operation pattern actually performed operations that are slightly different from each other in timing or operation details. For this reason, for example, the content providing server 1 may handle a plurality of operations each of which was performed at a playback position being within a predetermined period of time as operations that were performed at the same playback position. In this case, the content providing server 1 may determine, for example, a representative value of a plurality of playback positions as the playback position to be included in the content control information. The representative value may be, for example, the mode, the average, or the median of them. For example, the content providing server 1 may also classify the users' operations into three types of operations: an operation to turn up the volume level, an operation to turn down the volume level, and an operation to keep the volume level unchanged. In this case, some users who performed operations to change the volume level may have different post-change volume levels. In such a case, the content providing server 1 may determine, for example, a representative value of the volume levels as the volume level to be included in the content control information. The content providing server 1 may classify the users' operations by also taking the post-change volume levels into account. For example, the content providing server 1 may classify the users' operations according to the post-change volume levels. Alternatively, for example, based on the distribution of the post-change volume levels, the content providing server 1 may divide the range into subranges near relatively less frequent volume levels and classify the users' operations by the subranges.

In this embodiment, there are three types of playback mode change operations. Specifically, there are three items to be controlled by the change operations. For example, the content providing server 1 may identify operation changes for all the items in an integrated manner. Alternatively, for example, the content providing server 1 may identify operation changes for each of the items.

The content providing server 1 may identify each user's operation changes from the start to the end of playback of a moving image in advance, and then classify the users' operation changes into patterns. Then, for example, the content providing server 1 may select the most frequent pattern as an operation pattern that users tend to perform. Also in the method shown in FIG. 3A, the users' operation changes are classified into patterns and one of the pattern is selected based on the frequency of appearance of each pattern. However, in the method shown in FIG. 3A, some patterns that have less frequencies in the middle of the playback are ruled out as a candidate to be selected. The patterns ruled out as a candidate are not classified into any further patterns.

1-2. Configuration of Content Providing Server

The following describes a configuration of the content providing server 1 with reference to FIGS. 4A to 5E.

Figure 4A:
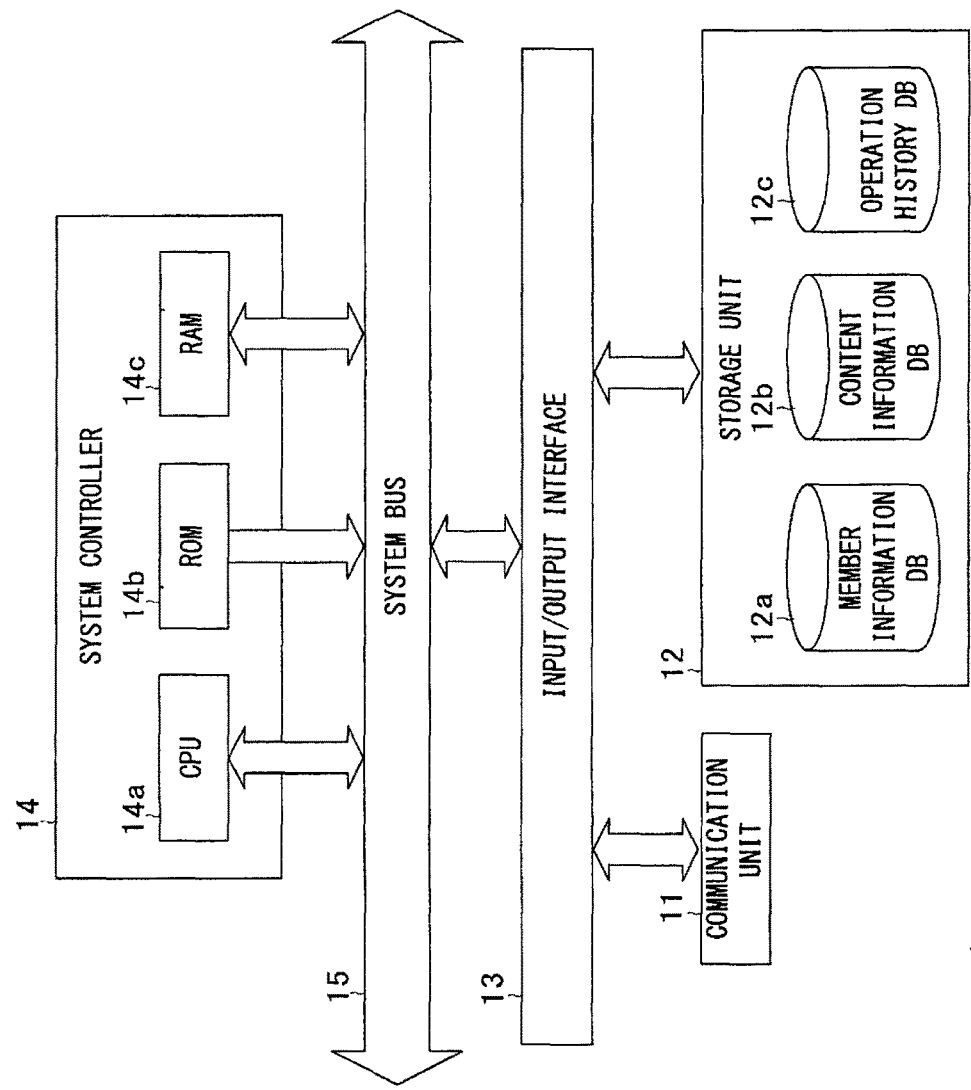
FIG. 4A is a block diagram schematically showing an example configuration of a content providing server 1 according to this embodiment.

FIG. 4A is a block diagram schematically showing an example configuration of the content providing server 1 according to this embodiment. As shown in FIG. 4, the content providing server 1 includes a communication unit 11, a storage unit 12, an input/output interface 13, and a system controller 14. The system controller 14 and the input/output interface 13 are connected via a system bus 15.

The communication unit 11 connects to the network NW and controls the state of communications with, for example, the user terminals 2.

The storage unit 12 includes, for example, hard disk drives. The storage unit 12 is an example of storage means of the present invention. In this storage unit 12, a member information DB 12, a content information DB 12b, an operation history DB 12c, and other databases are created. "DB" is an abbreviation for database.

FIG. 5A is a diagram showing example contents stored in the member information DB 12a. The member information DB 12a stores member information about users who have signed up for the information providing system S. Specifically, the member information DB 12a stores, for each user, the user's user ID, password, nickname, name, birth date, gender, zip code, address, telephone number, e-mail address, and other user attributes in association with each other. The user ID is identification information of the user.

FIG. 5B is a diagram showing example contents stored in the content information DB 12b. The content information DB 12b stores information about content. Specifically, the content information DB 12b stores, for each moving image, a content ID, moving image data, and content control information in association with each other. The moving image data is data of the moving image.

FIG. 5C is a diagram showing example contents of the content control information. The content control information includes a content ID and one or more control records. A control record is included for each playback position at which playback control of the moving image is to be performed. FIG. 5D is a diagram showing example contents of the control record. The control record includes a playback position, an operation item ID, and operation details information. The playback position indicates when to perform control. The playback position is an example of a timing of control of the present invention. The operation item ID indicates what is to be controlled. The operation item ID is set to "volume level", "playback speed", or "subtitles". When the operation item ID is "volume level", the operation details information includes a volume level change direction and a post-change volume level. When how volume level change operations tend to change is identified based on relative changes in the volume level, the operation details information may include a relative volume level instead of the volume level change direction and the post-change volume level. The volume level change direction is set to "up" or "down". "Up" indicates that the volume level is to be turned up. "Down" indicates that the volume level is to be turned down. When the operation item ID is "playback speed", the operation details information includes a playback speed change direction and a post-change playback speed. The playback speed change direction is set to "up" or "down". "Up" indicates that the playback speed is to be turned up. "Down" indicates that the playback speed is to be turned down. When the operation item ID is "subtitles", the operation details information includes a showing mode. The showing mode is set to "on" or "off". "On" indicates that the subtitles are to be shown. "Off" indicates that the subtitles are to be hidden. The operation details information is an example of details of control of the present invention.

FIG. 5E is a diagram showing example contents stored in the operation history DB 12c. The operation history DB 12c stores operation logs. Specifically, the operation history DB 12c stores a content ID, a user ID, an operation date and time, a playback position, an operation item ID, and operation details information in association with each other. The user ID indicates a user who performed an operation. The operation item ID is set to, for example, "volume level", "playback speed", "subtitles", or "skip". When the operation item ID is "volume level", "playback speed", or "subtitles", the operation details information includes the same information as the operation details information of the control record includes. When the operation item ID is "skip", the operation details information includes a skip direction and a playback position just after skipping. The skip direction is set to "forward" or "backward". The skip direction is an example of information indicating in which direction a playback position was moved in the present invention.

The following describes other information stored in the storage unit 12. The storage unit 12 stores various data, such as hypertext markup language (HTML) documents, extensible markup language (XML) documents, image data, text data, and electronic documents, for displaying web pages.

The storage unit 12 also stores various programs, such as an operating system, a streaming server program, a World Wide Web (WWW) server program, a database management system (DBMS), and a content control information processing program. The content control information processing program is a program for providing content control information. The content control information processing program is an example of an information processing program according to the present invention. The various programs may be available from, for example, another server device over the network NW, or may be recorded in a recording medium, such as a digital versatile disc (DVD), and be read via a drive device. The content control information processing program may be a program product.

The input/output interface 13 performs interface processing between the communication unit 11 and the storage unit 12, and the system controller 14.

Figure 4B:
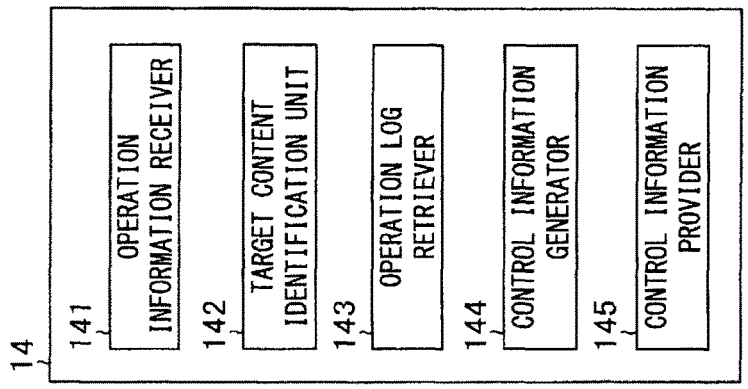
FIG. 4B is a diagram showing example functional blocks of the content providing server 1 according to this embodiment.

The system controller 14 includes, for example, a CPU 14a, a read only memory (ROM) 14b, and a random access memory (RAM) 14c. FIG. 4B is a diagram showing example functional blocks of the content providing server 1 according to this embodiment. The content control information processing program and other programs, which are executed by the CPU 14a, enable the system controller 14 to function as, for example, an operation information receiver 141, a target content identification unit 142, an operation log retriever 143, a control information generator 144, and a control information provider 145 of the present invention.

The operation information receiver 141 is an example of operation information obtaining means of the present invention. The target content identification unit 142 is an example of content identification information obtaining means and user identification information obtaining means of the present invention. The operation log retriever 143 is an example of log retrieval means and second log retrieval means of the present invention. The control information generator 144 is an example of generating means of the present invention. The control information provider 145 is an example of providing means and identifying means of the present invention.

The operation information receiver 141 obtains operation information sent from the user terminal 2 to the content providing server 1 via the communication unit 11. The target content identification unit 142 obtains the content ID of content for which content control information is to be generated. For example, when the content control information generation process is periodically performed, the target content identification unit 142 may sequentially obtain the content ID of each piece of content. Alternatively, for example, when the content control information generation process is performed at the start or the end of presentation of content, the target content identification unit 142 may obtain the content ID of the content played back from the user terminal 2. The operation log retriever 143 retrieves operation logs corresponding to the content ID obtained by the target content identification unit 142 from the operation history DB 12c. The control information generator 144 identifies how operations tend to change, based on the operation logs retrieved by the operation log retriever 143. Then, the control information generator 144 generates content control information in accordance with the identified tendency. The control information provider 145 provides the user terminal 2 with the content control information generated by the control information generator 144. Processes in these units are described in detail below.

The content providing server 1 may include a plurality of server devices. For example, a server device that provides content, a server device that provides content control information, a server device that manages databases, and other server devices may be connected to each other via a LAN or the like.

1-3. Operation of Information Providing System

Figure 6:
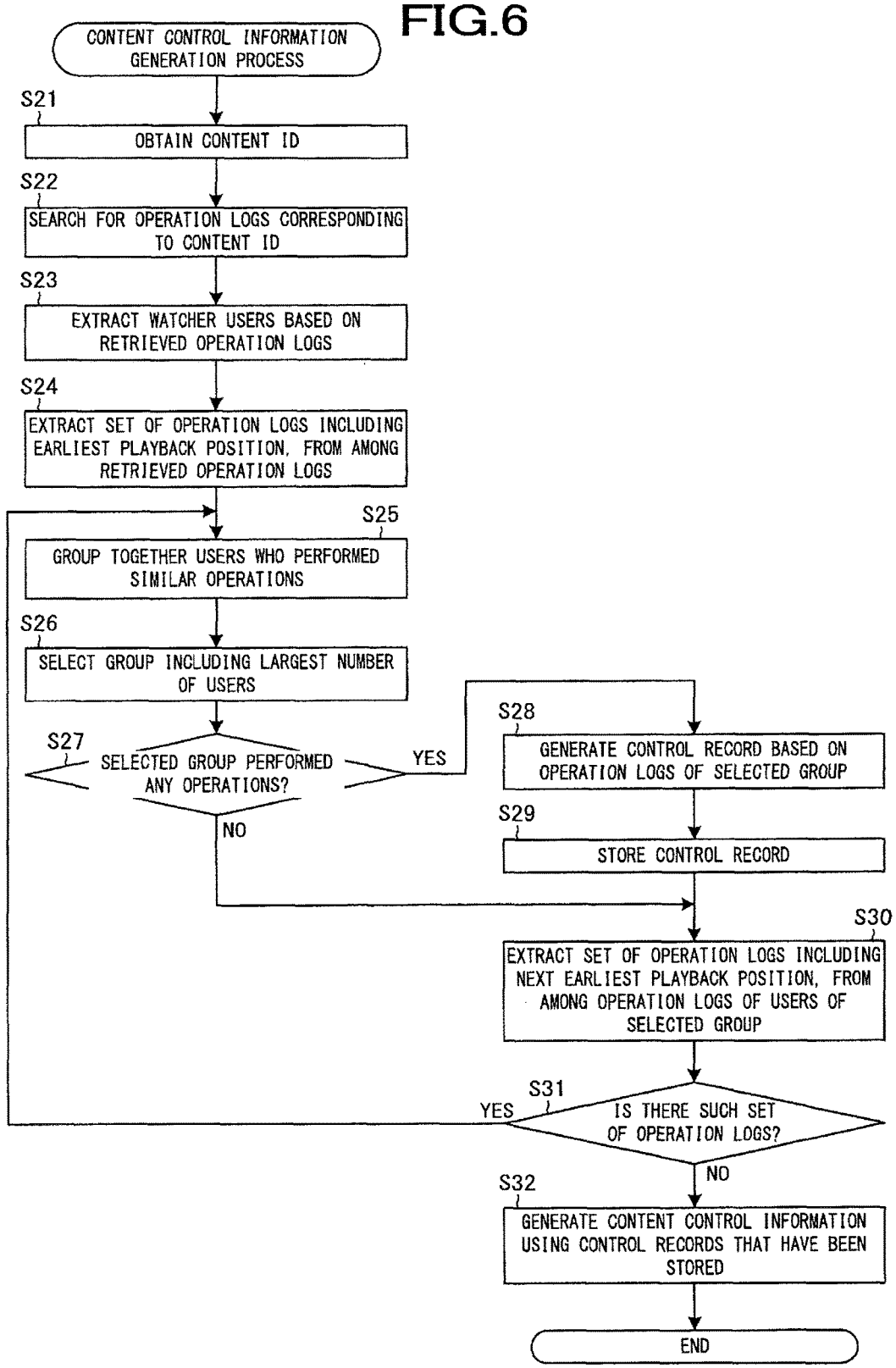
FIG. 6 is a flowchart showing an example process of a content control information generation process in a system controller 14 of the content providing server 1 according to this embodiment.

The following describes an operation of the information providing system S with reference to FIG. 6.

FIG. 6 is a flowchart showing an example process of the content control information generation process in the system controller 14 of the content providing server 1 according to this embodiment.

As shown in FIG. 6, the target content identification unit 142 obtains the content ID of a moving image for which content control information is to be generated (Step S21). The content ID obtained in Step S21 is referred to as a target content ID. Subsequently, the operation log retriever 143 searches the operation history DB 12c for operation logs that include the obtained content ID (Step S22). At this time, the operation log retriever 143 searches for operation logs that include the operation item ID set to any one of "volume level", "playback speed", and "subtitles". Based on the user IDs included in the retrieved operation logs, the control information generator 144 extracts users who watched the moving image identified by the content ID (Step S23).

Next, the control information generator 144 extracts, from among the retrieved operation logs, a set of operation logs that include the earliest playback position (Step S24). For example, the control information generator 144 extracts one of the operation logs that include the earliest playback position. Then, the control information generator 144 extracts operation logs that include a playback position being within a predetermined time range from the playback position of the extracted operation log. The control information generator 144 identifies, as the set of operation logs, the operation logs that include the earliest playback position and the operation logs that include a playback position being within the predetermined time range.

Subsequently, based on the extracted set of operation logs, the control information generator 144 divides the users whose operation log is included in the set of operation logs into groups according to their operation details (Step S25). Specifically, the control information generator 144 groups together operation logs that include both the same operation item ID and similar pieces of operation details information. When the operation item ID is "volume level", the similar pieces of operation details information mean, for example, that their volume level change directions are the same and that the difference between their volume levels is less than or equal to a predetermined value. When how volume level change operations tend to change is identified based on relative changes in the volume level, the similar pieces of operation details information mean, for example, that the difference between their relative volume levels is less than or equal to a predetermined value. When the operation item ID is "playback speed", the similar pieces of operation details information mean, for example, that their playback speed change directions are the same and that the difference between their playback speeds is less than or equal to a predetermined value. When the operation item ID is "subtitles", the similar pieces of operation details information mean that their showing modes are the same. Among the users who watch the moving image, the control information generator 144 puts the users whose operation log is not included in the extracted set of operation logs in a non-operation group.

Next, the control information generator 144 selects the largest of the groups as a majority (Step S26). Then, the control information generator 144 determines whether the selected group is a group who performed any operations (Step S27). Here, if the control information generator 144 determines that the selected group is a group who performed no operation (NO in Step S27), the process proceeds to Step S30. On the other hand, if the control information generator 144 determines that the selected group is a group who performed some operations (YES in Step S27), the process proceeds to Step S28.

In Step S28, the control information generator 144 generates a control record based on the operation logs of the group selected from the extracted set of operation logs. Specifically, the control information generator 144 determines a playback position, an operation item ID, and operation details information to be included in the control record. For example, the control information generator 144 determines a representative value of the playback positions included in the operation logs as the playback position to be set. The control information generator 144 also determines the operation item ID included in the operation logs as the operation item ID to be set. The control information generator 144 also determines the volume level change direction or the playback speed change direction included in the pieces of operation details information of the operation logs as the volume level change direction or the playback speed change direction to be set. The control information generator 144 also determines a representative value of the volume levels or the playback speeds included in the pieces of operation details information of the operation logs as the volume level or the playback speed to be set. The control information generator 144 also determines the showing mode included in the pieces of operation details information of the operation logs as the showing mode to be set. Then, the control information generator 144 stores the control record, which includes the determined playback position, operation item ID, and operation details information, in the RAM 14c (Step S29).

Subsequently, the control information generator 144 extracts a set of operation logs that include the next earliest playback position, from among the operation logs of the users of the selected group, among the operation logs retrieved in Step S22 (Step S30). The extracting method is essentially the same as that in Step S24. Then, the control information generator 144 determines whether it can extract such a set of operation logs (Step S31). Here, if the control information generator 144 determines that it can extract such a set of operation logs (YES in Step S31), the process proceeds to Step S25. Steps S25 and S26 are performed based on the set of operation logs extracted in Step S30. In Step S25, the control information generator 144 puts the users whose operation log is not included in the extracted set of operation logs, among the users of selected as the majority, in the non-operation group. On the other hand, if the control information generator 144 determines that it cannot extract such a set of operation logs (NO in Step S31), the process proceeds to Step S32.

In Step S32, the control information generator 144 generates content control information that includes the target content ID and that includes the control records that have been stored in the RAM 14c. Then, the control information generator 144 stores the generated content control information in association with the target content ID in the content information DB 12b. After Step S32, the control information generator 144 terminates the content control information generation process.

The example process shown in FIG. 6 is an example where operation changes are identified in an integrated manner for all of the items: the volume level, the playback speed, and the subtitles. The following describes a case where operation changes are identified for each of the items to be operated. After Step S21, Steps S22 to S31 are performed for each of the items. In Step S22, the operation log retriever 143 searches for operation logs that include the operation item ID "volume level". Steps S23 to S31 are the same as those described above. When the steps for volume level change operations end (NO in Step S31), the process returns to Step S22. Here, the operation log retriever 143 searches for operation logs that include the operation item ID "playback speed", and Steps S23 to S31 are then performed. When the steps for playback speed change operations end (NO in Step S31), the process returns to Step S22. Here, the operation log retriever 143 searches for operation logs that include the operation item ID "subtitles", and Steps S23 to S31 are then performed. When the steps for subtitles change operations end (NO in Step S31), the process proceeds to Step S32. The RAM 14c has stored the control records for the volume level, the control records for the playback speed, and the control records for the subtitles. The control information generator 144 generates content control information using these control records.

As described above, according to this embodiment, the system controller 14 obtains the content ID of content to be presented. In association with the content ID, the storage unit 12 stores operation logs each of which includes at least one of the operation date and time and the playback position, at which an operation to control presentation of content was performed during presentation of content, and operation details information indicating details of the operation. The system controller 14 retrieves operation logs corresponding to the obtained content ID from the storage unit 12. The system controller 14 also generates content control information that includes control records, in accordance with a tendency of operation changes that is identified based on the retrieved operation logs. Then, the system controller 14 provides the generated content control information. Consequently, the user terminal 2 can appropriately control how to present content during presentation of the content.

Based on the frequency of appearance of each of one or more patterns into which one or more changes identified based on the operation logs are divided, the system controller 14 selects at least one of the patterns and generates content control information in accordance with the selected pattern. This allows for control using appropriate content control information.

2. Second Embodiment

The following describes a second embodiment with reference to FIGS. 7 to 11. In this embodiment, the content providing server 1 generates a plurality of pieces of content control information for one moving image. Then, the content providing server 1 provides at least one of the pieces of content control information to the user terminal 2.

To generate a plurality of pieces of content control information, the content providing server 1 identifies a plurality of patterns that appear relatively frequently, among patterns into which operation changes are classified. For example, the content providing server 1 identifies, as a majority, the users who performed the most frequent operation at a playback position at which change operations were performed. Then, for example, the content providing server 1 may identify, as a quasi-majority, the users who performed operations whose percentage of the frequency of appearance to the frequency of appearance of the operations performed by the majority is greater than or equal to a preset reference value. In some cases, only one quasi-majority is identified. In other cases, a plurality of quasi-majorities are identified. Instill other cases, no quasi-majority is identified. The content providing server 1 identifies, for each of the identified majority and quasi-majority(ies), a majority and quasi-majority(ies) at the next playback position.

Figure 7:
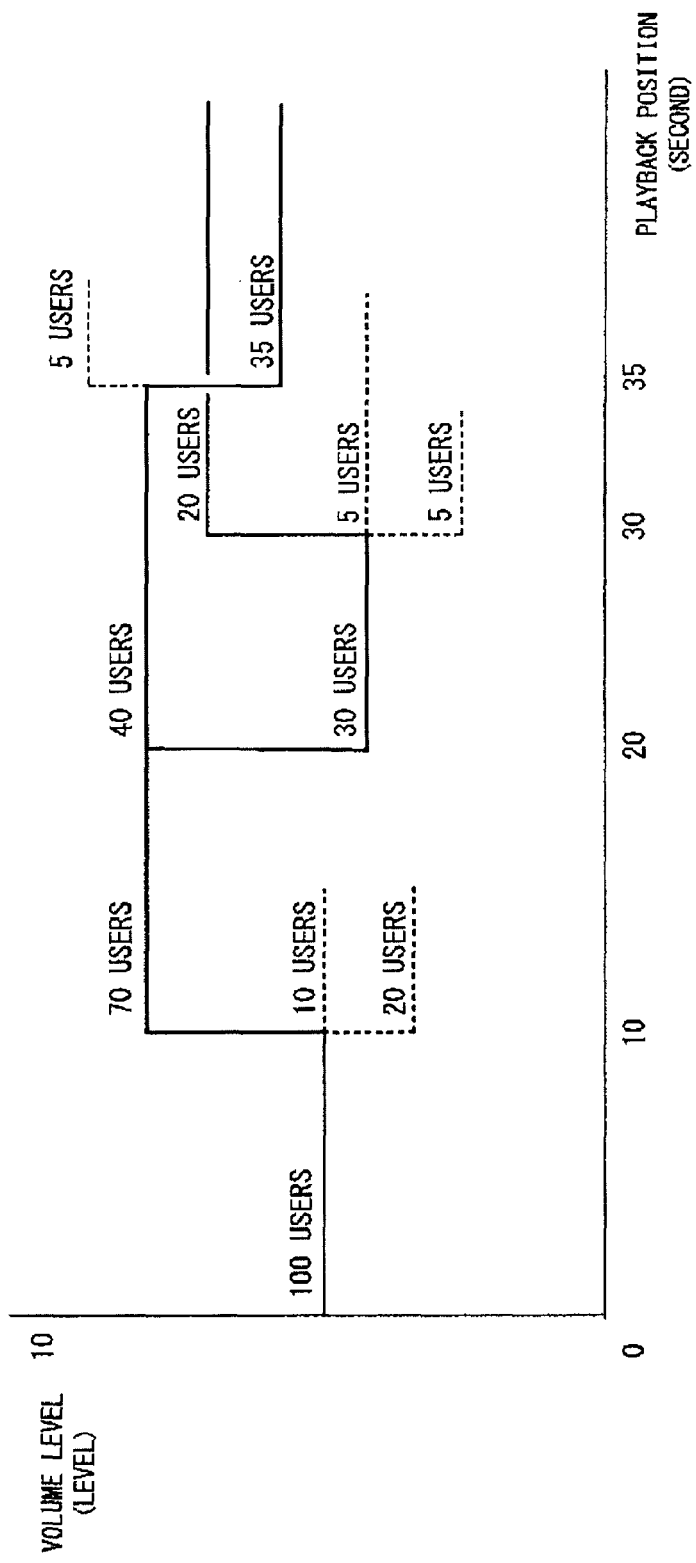
FIG. 7 is a graph showing changes in the volume level during playback of a moving image.

FIG. 7 is a graph showing changes in the volume level during playback of a moving image. The changes shown in FIG. 7 are essentially the same as the changes shown in FIG. 3A. For example, assume that the reference value is 50%.

Ten seconds after the start of playback of the moving image, seventy users turned up the volume level from Level 5 to Level 8, twenty users turned down the volume level from Level 5 to Level 3, and ten users did not change the volume level. The majority in this case is the users who turned up the volume level. The number of the users who turned down the volume level and the number of the users who did not change the volume level are each less than 50% of the number of the majority users. Thus, only the users who turned up the volume level are identified as the majority.

Twenty seconds after the start of playback of the moving image, out of the seventy users who turned up the volume level, forty users did not change the volume level and thirty users turned down the volume level from Level 8 to Level 4. The majority in this case is the users who did not change the volume level. The number of the users who turned down the volume level is 50% or more of the number of the majority users. Thus, the users who turned down the volume level are identified as a quasi-majority.

Thirty five seconds after the start of playback of the moving image, out of the forty users who did not change the volume level, thirty five users changed the volume level from Level 8 to Level 6 and five users turned up the volume level from Level 8 to Level 9. The majority in this case is the users who turned down the volume level. The number of the users who turned up the volume level is less than 50% of the number of the majority users. Thus, only the users who turned down the volume level are identified as the majority. In this way, one pattern is identified.

On the other hand, 30 seconds after the start of playback of the moving image, out of the thirty users who turned down the volume level, twenty users turned up the volume level from Level 4 to Level 7, five users turned down the volume level to Level 2, and five users did not change the volume level. The majority in this case is the users who turned up the volume level. The number of the users who turned down the volume level and the number of the users who did not change the volume level are each less than 50% of the number of the majority users. Thus, only the users who turned up the volume level are identified as the majority. In this way, another pattern is identified.

The content providing server 1 may classify each user's operation changes from the start to the end of playback of a moving image into patterns in advance. Then, the content providing server 1 may select a plurality of relatively frequent patterns as operation patterns that users tend to perform.

When the user terminal 2 starts playback of content, for example, the content providing server 1 may provide content control information generated in accordance with the most frequent pattern. In some cases, when the user terminal 2 automatically plays back content in accordance with the content control information, the control pattern may not suit preferences of a user who is viewing or listening to the content. In such a case, the user can perform a playback mode change operation. In this case, the content providing server 1 may provide content control information that matches the playback mode change operation performed by the user, among pieces of content control information different from the content control information provided first.

Thus, the user terminal 2 can control playback of the content in accordance with content control information that is likely to conform to how the user tends to perform operations. The content control information that is likely to conform to how the user tends to perform operations may be, for example, content control information for causing control that is identical or similar to the details of the playback mode change operation performed by the user to be performed at a playback position that is identical or similar to the playback position at which the playback mode change operation was performed.

Figure 8:
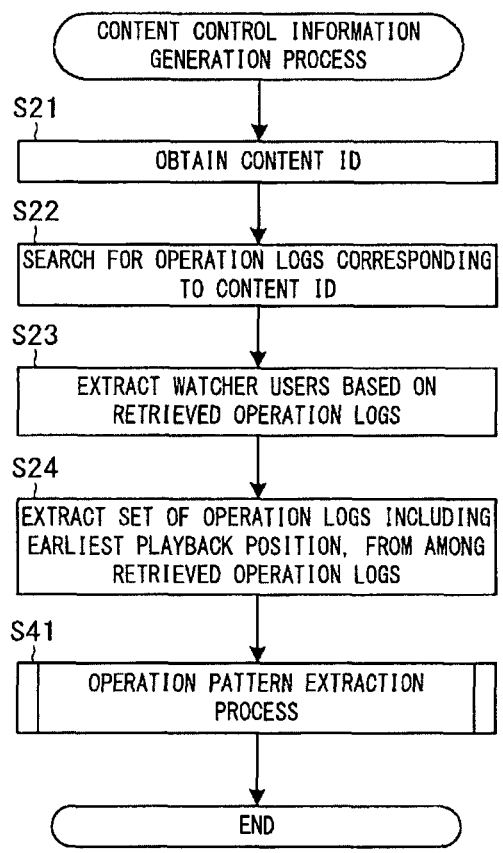
FIG. 8 is a flowchart showing an example process of the content control information generation process in the system controller 14 of the content providing server 1 according to this embodiment.

FIG. 8 is a flowchart showing an example process of the content control information generation process in the system controller 14 of the content providing server 1 according to this embodiment. In FIG. 8, the same components as in FIG. 6 are denoted by the same reference signs. As shown in FIG. 8, Steps S21 to S24 are performed first. Then, the control information generator 144 performs an operation pattern extraction process (Step S41).

Figure 9:
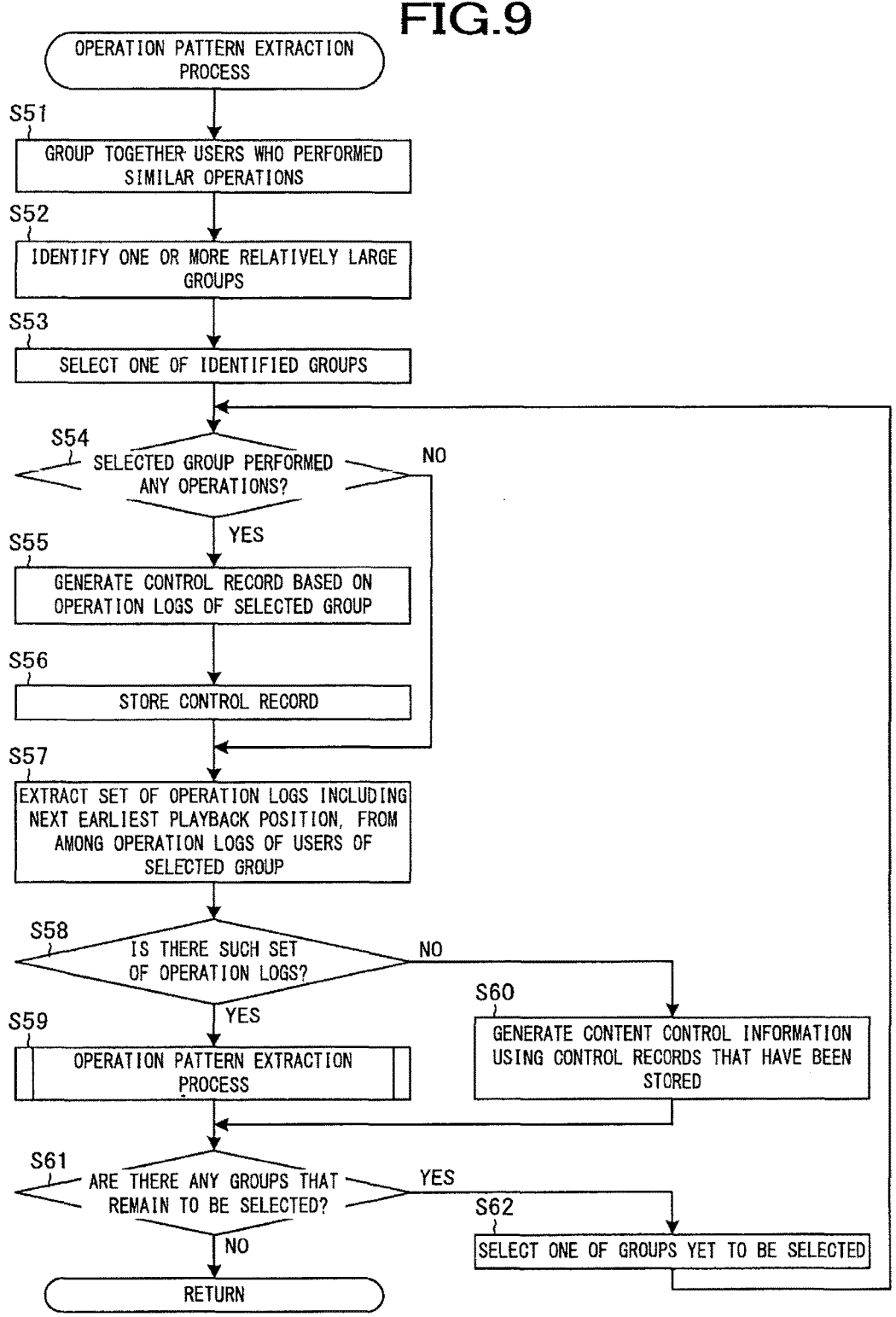
FIG. 9 is a flowchart showing an example process of an operation pattern extraction process in the system controller 14 of the content providing server 1 according to this embodiment.

FIG. 9 is a flowchart showing an example process of the operation pattern extraction process in the system controller 14 of the content providing server 1 according to this embodiment. As shown in FIG. 9, the control information generator 144 groups together users who performed similar operations on the same item (Step S51). The details of this step are the same as those of Step S25 of FIG. 6. Subsequently, the control information generator 144 identifies one or more relatively large groups (Step S52). Specifically, the control information generator 144 selects the largest group as a majority. Then, the control information generator 144 calculates a reference user count by multiplying the number of the majority by a reference value. Next, the control information generator 144 selects, as quasi-majority(ies), group(s) whose number of users is greater than or equal to the reference user count.

Subsequently, the control information generator 144 selects one of the identified groups (Step S53). Then, the control information generator 144 determines whether the selected group is a group who performed any operations (Step S54). Here, if the control information generator 144 determines that the selected group is a group who performed no operation (NO in Step S54), the process proceeds to Step S57. On the other hand, if the control information generator 144 determines that the selected group is a group who performed some operations (YES in Step S54), the process proceeds to Step S55.

In Step S55, the control information generator 144 determines a playback position, an operation item ID, and operation details information to be included in a control record, based on the operation logs of the selected group among the extracted set of operation logs. They are determined in the same manner as in Step S28 of FIG. 6. Then, the control information generator 144 stores the control record, which includes the determined playback position, operation item ID, and operation details information, in the RAM 14c (Step S56). Subsequently, the control information generator 144 extracts a set of operation logs that include the next earliest playback position, from among the operation logs of the users of the selected group, among the operation logs retrieved in Step S22 (Step S57). The details of this step are the same as those of Step S30 of FIG. 6. Then, the control information generator 144 determines whether it can extract such a set of operation logs (Step S58). Here, if the control information generator 144 determines that it can extract such a set of operation logs (YES in Step S58), the process proceeds to Step S59. On the other hand, if the control information generator 144 determines that it cannot extract such a set of operation logs (NO in Step S58), the process proceeds to Step S60.

In Step S59, the control information generator 144 recursively performs the operation pattern extraction process. After the control information generator 144 finishes Step S59, the process proceeds to Step S61. In Step S60, the control information generator 144 generates content control information. If the control information generator 144 determines in Step S58 that it cannot extract a corresponding set of operation logs, it means that one pattern of operation changes from the start to the end of playback of the moving image has just been identified. Thus, the control information generator 144 generates content control information that includes control record(s) corresponding to the pattern identified at this stage. The control information generator 144 then calculates the frequency of appearance of the identified pattern by dividing the number of the users of the selected group by the number of users who watched the moving image. The control information generator 144 also generates a control information ID. The control information ID is identification information of the content control information. Then, the control information generator 144 stores the content control information, the frequency of appearance, the control information ID in association with the target content ID in the content information DB 12b. After the control information generator 144 finishes Step S60, the process proceeds to Step S61.

In Step S61, the control information generator 144 determines whether any groups remain to be selected from among the groups identified in Step S52. Here, if the control information generator 144 determines that some of the groups remain to be selected (YES in Step S61), the process proceeds to Step S62. In Step S62, the control information generator 144 selects one of the groups yet to be selected. Then, the control information generator 144 causes the process to proceed to Step S54. On the other hand, if it determines that all the groups have been selected (NO in Step S61), the control information generator 144 terminates the operation pattern extraction process and further terminates the content control information generation process.

The following describes a case where operation changes are identified for each of the items to be operated. For example, Steps S24 and S41 are performed for each item. In Step S60, content control information is generated for each item and is stored, for example, in association with the corresponding operation item ID. When the user terminal 2 starts playback of a moving image, the content providing server 1 sends content control information for the volume level, content control information for the playback, and content control information for the subtitles to the user terminal 2. At this time, for example, the content providing server 1 may provide, for each item, content control information generated in accordance with the most frequent pattern.

Figure 10:
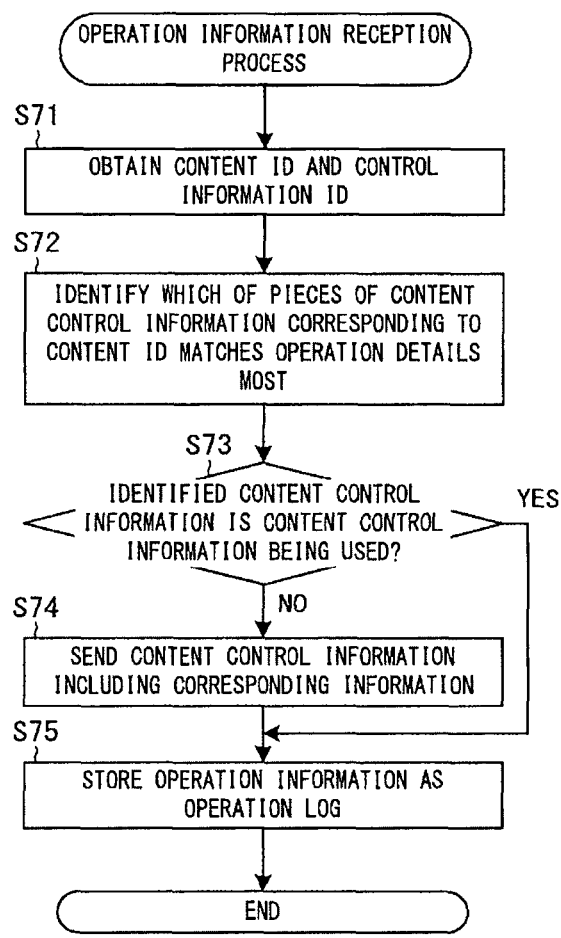
FIG. 10 is a flowchart showing an example process of an operation information reception process in the system controller 14 of the content providing server 1 according to this embodiment.

FIG. 10 is a flowchart showing an example process of an operation information reception process in the system controller 14 of the content providing server 1 according to this embodiment. The operation information reception process is started when the operation information receiver 141 receives operation information sent from the user terminal 2, which is automatically controlling playback of content in accordance with content control information, to the content providing server 1. The operation information in this case includes the control information ID of the content control information that is being used for controlling the current playback.

As shown in FIG. 10, the operation information receiver 141 obtains the content ID and the control information ID from the received operation information (Step S71). Subsequently, the control information provider 145 identifies which of the pieces of content control information that correspond to the obtained content ID matches the operation indicated by the operation information (Step S72). Specifically, the control information provider 145 searches each of the pieces of content control information that correspond to the obtained content ID in the content information DB 12b for a control record that includes both the same operation item ID as is included in the operation information and operation details information similar to the operation details information included in the operation information. Then, the control information provider 145 calculates the difference between the playback position included in the operation information and the playback position included in each of the retrieved control records. Next, the control information provider 145 calculates a similarity between the operation information and each piece of content control information, based on the corresponding difference in the operation details information and the corresponding difference in the playback position. For example, the smaller the difference in the operation details information is, the higher the similarity calculated by the control information provider 145 is. The smaller the difference in the playback position is, the higher the similarity is. Then, the control information provider 145 identifies the content control information that has the highest similarity as the content control information that matches the operation indicated by the operation information.

Subsequently, the control information provider 145 determines whether the identified content control information is the content control information that is being used for controlling the current playback, based on the control information ID obtained from the operation information (Step S73). Here, if the control information provider 145 determines that the identified content control information is the content control information that is being used for controlling the current playback (YES in Step S73), the process proceeds to Step S75. On the other hand, if the control information provider 145 determines that the identified content control information is different from the content control information that is being used for controlling the current playback (NO in Step S73), the process proceeds to Step S74.

In Step S74, the information provider 145 sends the identified content control information to the user terminal 2 that has sent the operation information. Then, the control information provider 145 causes the process to proceed to Step S75. In Step S75, the operation information receiver 141 stores the received operation information as an operation log in the operation history DB 12c. After Step S75, the operation information receiver 141 terminates the operation information reception process.

The following describes a case where operation changes have been identified for each of the items to be operated. In Step S72, the control information provider 145 identifies which of the pieces of content control information that correspond to the content ID included in the operation information matches the operation indicated by the received operation information.

Figure 11:
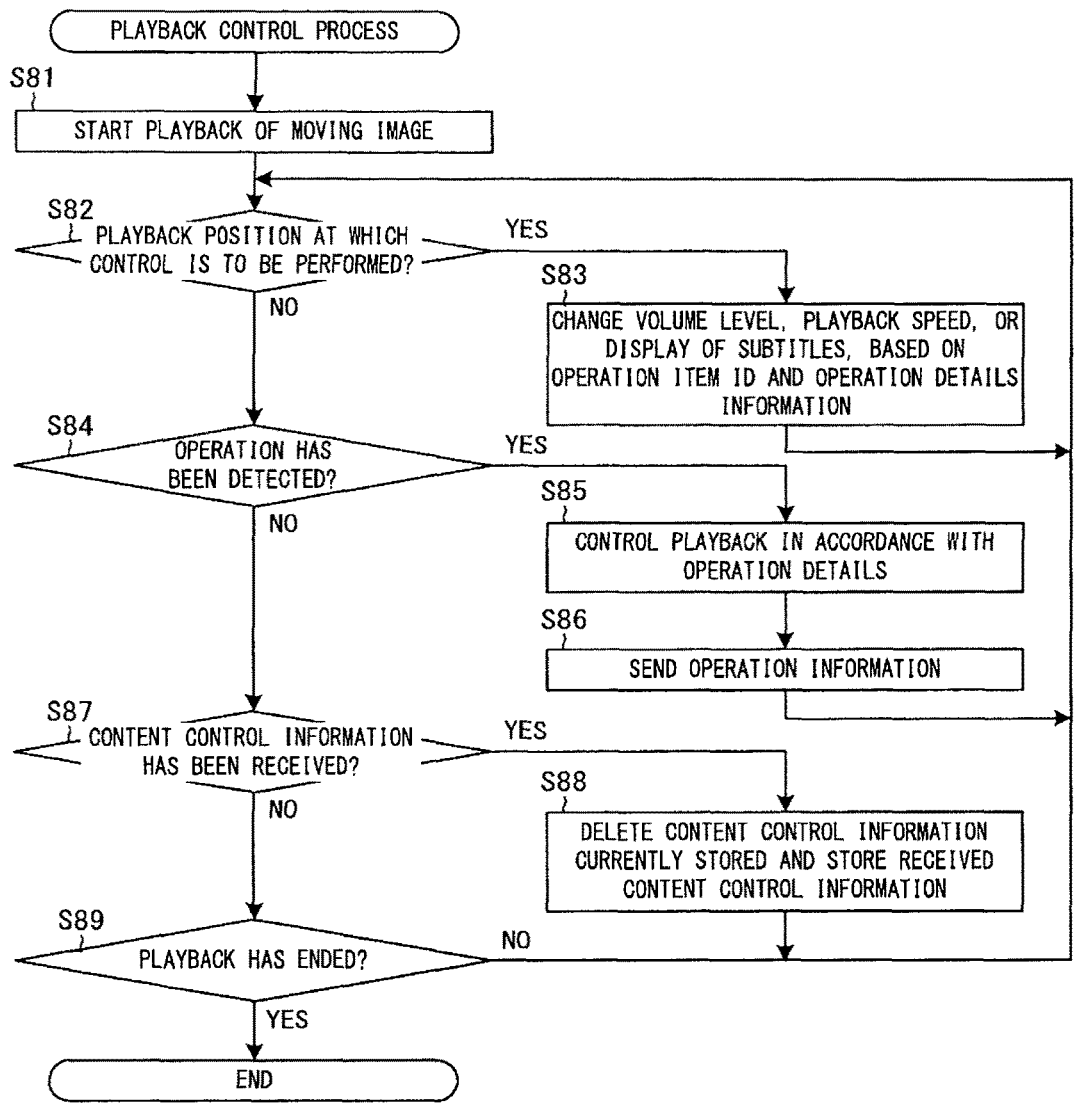
FIG. 11 is a flowchart showing an example process of a playback control process in a user terminal 2 according to this embodiment.

FIG. 11 is a flowchart showing an example process of a playback control process in the user terminal 2 according to this embodiment. The playback control process is started when the user terminal 2 receives a moving image and content control information from the content providing server 1 after sending a content request to the content providing server 1. The playback control process is executed by a CPU that the user terminal 2 includes.

As shown in FIG. 11, the user terminal 2 stores the received content control information in a memory that the user terminal 2 includes. Then, the user terminal 2 starts playback of the moving image (Step S81). Subsequently, based on the playback positions of the control records included in the content control information, the user terminal 2 determines whether the current playback position of the moving image is a playback position at which content playback control is to be performed (Step S82). Here, if the user terminal 2 determines that the current playback position is not a playback position at which content playback control is to be performed (NO in Step S82), the process proceeds to Step S84. On the other hand, if the user terminal 2 determines that the current playback position is a playback position at which content playback control is to be performed (YES in Step S82), the process proceeds to Step S83. In Step S83, the user terminal 2 controls how to play back content, in accordance with the operation item ID and the operation details information included in the control record corresponding to the current playback position. If the operation item ID is "volume level", the user terminal 2 changes the output volume level of the sound to the volume level included in the operation details information. If the operation item ID is "playback speed", the user terminal 2 changes the playback speed of the moving image to the playback speed included in the operation details information and plays back the moving image. If the operation item ID is "subtitles" and the showing mode is "on", the user terminal 2 displays subtitles on the display screen of the moving image at and after the current time. If the operation item ID is "subtitles" and the showing mode is "off", the user terminal 2 clears the subtitles being currently shown from the screen and causes subtitles not to be shown at and after the current time. Next, the user terminal 2 causes the process to proceed to Step S82.

In Step S84, the user terminal 2 determines whether an operation by a user has been detected. Here, if the user terminal 2 determines that no operation has been detected (NO in Step S84), the process proceeds to Step S87. On the other hand, if the user terminal 2 determines that an operation has been detected (YES in Step S84), the process proceeds to Step S85. In Step S85, the user terminal 2 controls how to play back a moving image, in accordance with details of the operation. Subsequently, the user terminal 2 generates operation information based on the details of the operation. Then, the user terminal 2 sends the generated operation information to the content providing server 1 (Step S86). After the user terminal 2 finishes Step S86, the process proceeds to Step S82.

In Step S87, the user terminal 2 determines whether new content control information has been received from the content providing server 1. Here, if the user terminal 2 determines that no content control information has been received (NO in Step S87), the process proceeds to Step S89. On the other hand, if the user terminal 2 determines that content control information has been received (YES in Step S87), the process proceeds to Step S88. In Step S88, the user terminal 2 deletes the content control information that is currently stored in the memory and stores the received content control information in the memory. Next, the user terminal 2 causes the process to proceed to Step S82.

In Step S89, the user terminal 2 determines whether the playback of the moving image has ended. Here, if the user terminal 2 determines that the playback of the moving image has not yet ended (NO in Step S89), the process proceeds to Step S82. On the other hand, if the user terminal 2 determines that the playback of the moving image has ended (YES in Step S89), the user terminal 2 terminates the playback control process.

As described above, according to this embodiment, the system controller 14 provides content control information generated in accordance with one of a plurality of patterns identified from operation logs. When an operation to control presentation of content is performed while the presentation of the content is being automatically controlled in accordance with the provided content control information, the system controller 14 obtains operation information. Then, the system controller 14 provides content control information generated in accordance with a pattern that matches the operation indicated by the obtained operation information, among patterns different from the pattern corresponding to the provided content control information. Consequently, presentation can be controlled appropriately depending on an actual operation.

3. Third Embodiment

Figure 12:
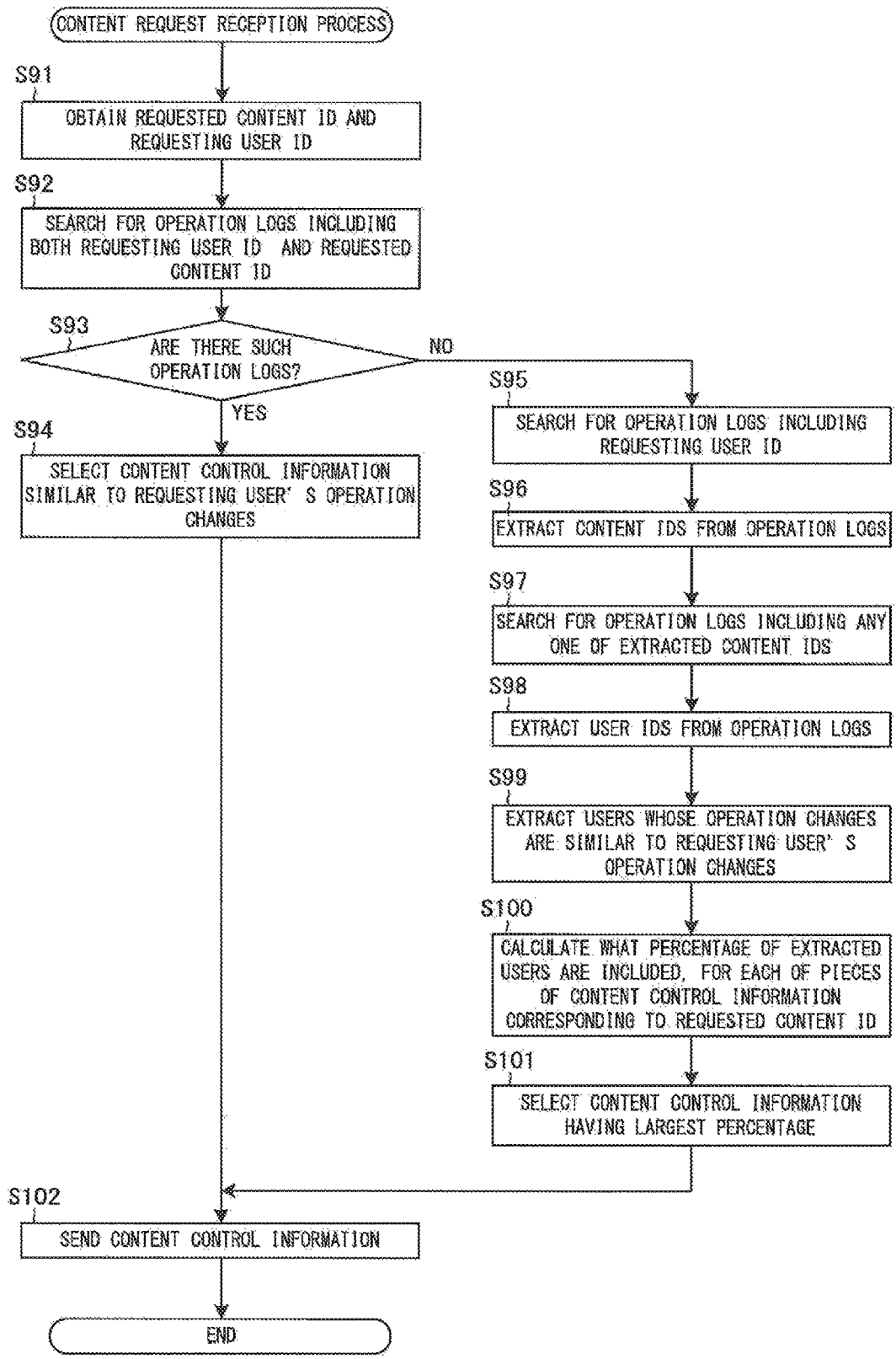
FIG. 12 is a flowchart showing an example process of a content request reception process in the system controller 14 of the content providing server 1 according to this embodiment.

The following describes a third embodiment with reference to FIG. 12. In this embodiment, based on operation logs of a user who has requested a moving image, the content providing server 1 provides content control information that is likely to conform to how the user tends to perform operations, among a plurality of pieces of content control information.

The content providing server 1 first retrieves operation logs corresponding to the requested moving image, from among the operation logs of a user who has requested a moving image. The user who has requested the moving image is referred to as a requesting user. The requesting user is an example of a first user of the present invention. The moving image that the user has requested is referred to as a requested moving image. When any corresponding operation logs are found, the content providing server 1 provides the content control information most similar to operation changes identified from the retrieved operation logs.

When no corresponding operation logs are found, the content providing server 1 identifies moving images that the requesting user has watched before, based on the user's operation logs. These moving images are referred to as reference moving images. The reference moving images are moving images different from the requested moving image. The content providing server 1 may select, for example, only moving images similar to the requested moving image as the reference moving images. For example, the content providing server 1 may select moving images belonging to the same genre as the requested moving image. The content providing server 1 identifies users different from the requesting user, among users who have watched the reference moving images before, as reference users. Each reference user is an example of second users of the present invention. Then, based on the operation logs of the requesting user and the operation logs of the reference users, the content providing server 1 identifies reference users whose operation changes during playback of a reference moving image are similar to those of the requesting user. The reference users whose operation changes are similar to those of the requesting user are referred to as similar users. The content providing server 1 provides content control information corresponding to a pattern that includes the largest percentage of the similar users' operation changes, among a plurality of pieces of content control information that correspond to the requested moving image. Consequently, even when the user has never watched the moving image that the user is about to watch, the user terminal 2 can control playback of the moving image using content control information that is likely to conform to how the user tends to perform operations.

The content control information generation process and the operation pattern extraction process in this embodiment are essentially the same as those in the second embodiment. However, in Step S60 of the operation pattern extraction process, the control information generator 144 stores the content control information and the user IDs of the users of the selected group in association with each other in the content information DB 12b. The reason is that the content providing server 1 identifies which users performed operations in the pattern corresponding to the generated content control information.

FIG. 12 is a flowchart showing an example process of a content request reception process in the system controller 14 of the content providing server 1 according to this embodiment. The content request reception process is started when the target content identification unit 142 receives a content request sent from the user terminal 2 to the content providing server 1. The content request includes a requested content ID and a requesting user ID. The requested content ID is the content ID of a requested moving image. The requesting user ID is the user ID of a requesting user.

As shown in FIG. 12, the target content identification unit 142 obtains the requested content ID and the requesting user ID from the content request (Step S91). Subsequently, the operation log retriever 143 searches the operation history DB 12c for operation logs that include both the requested content ID and the requesting user ID (Step S92). Then, the operation log retriever 143 determines whether it can retrieve such operation logs (Step S93). Here, if the operation log retriever 143 determines that it cannot retrieve such operation logs (NO in Step S93), the process proceeds to Step S95. On the other hand, if the operation log retriever 143 determines that it can retrieve such operation logs (YES in Step S93), the process proceeds to Step S94.

In Step S94, the control information provider 145 selects content control information that is most similar to the requesting user's operation changes, from among the pieces of content control information corresponding to the requested content ID in the content information DB 12b. For example, the control information provider 145 calculates a similarity between each of the retrieved operation logs and each of the control records included in each piece of content control information. Specifically, the control information provider 145 combines an operation log and a control record which both have the same operation item ID. At this time, the control information provider 145 combines the operation log and the control record so that their playback positions are as close as possible to each other and their pieces of operation details information are as close as possible to each other between the operation log and the control record. The control information provider 145 calculates the similarity for the combination, based on the playback position and the operation details information of the operation log and on the playback position and the operation details information of the control record. For example, the smaller the difference in the operation details information is, the higher the similarity calculated by the control information provider 145 is. The smaller the difference in the playback position is, the higher the similarity is. The control information provider 145 calculates the similarity of the content control information, based on the similarities for all the combinations. The control information provider 145 selects the content control information that has the highest similarity, from among the plurality of pieces of content control information. After the control information provider 145 finishes Step S94, the process proceeds to Step S102.

In Step S95, the operation log retriever 143 searches the operation history DB 12c for operation logs that include the requesting user ID. Then, the operation log retriever 143 extracts the content IDs from the retrieved operation logs (Step S96). Subsequently, the operation log retriever 143 searches the operation history DB 12c for operation logs each of which includes both any one of the extracted content IDs and a user ID different from the requesting user ID (Step S97). Then, the operation log retriever 143 extracts the user IDs of reference users from the retrieved operation logs (Step S98).

Next, the control information provider 145 extracts similar users whose operation changes are similar to the requesting user's operation changes from among the reference users, based on the retrieved operation logs (Step S99). For example, the control information provider 145 divides the operation logs of the requesting user ID according to which moving image they are associated with, and also divides the operation logs of the reference users according to which combination of a reference moving image and a reference user they are associated with. Then, the control information provider 145 calculates, for the same moving image, a similarity between each operation log of the requesting user ID and each operation log of each reference user. Based on the similarity of each pair of operation logs, the control information provider 145 calculates a similarity for each combination of a reference moving image and a reference user. The step of calculating the similarity is essentially the same as Step S94. The control information provider 145 extracts reference users who have a similarity greater than or equal to a preset threshold value as similar users.

Subsequently, the control information provider 145 calculates what percentage of similar users' operation changes are included in each of the pieces of content control information that correspond to the requested content ID (Step S100). Specifically, the control information provider 145 retrieves the user IDs corresponding to each piece of content control information from the content information DB 12b. Then, the control information provider 145 counts, for each piece of content control information, the total number of the retrieved user IDs. Next, the control information provider 145 calculates, for each piece of content control information, the number of user IDs each of which is identical to the user ID of a similar user, among the retrieved user IDs. Then, the control information provider 145 calculates a percentage by dividing the number of user IDs each of which is identical to the user ID of a similar user by the total number of the retrieved user IDs. Subsequently, the control information provider 145 selects the content control information that includes the largest percentage of the similar users' operation changes from among the pieces of content control information that correspond to the requested content ID (Step S101). The control information provider 145 may select the content control information associated with the most user IDs each of which is identical to the user ID of a similar user. After the control information provider 145 finishes Step S101, the process proceeds to Step S102.

In Step S102, the control information provider 145 sends the content control information selected in Step S94 or S101 to the user terminal 2 that has sent the content request. After Step S102, the control information provider 145 terminates the content request reception process.

The following describes a case where operation changes are identified for each of the items to be operated. In this case, after Step S91, Steps S92 to S102 are performed for each of the items. For example, when content control information corresponding to the volume level is generated, in Steps S92, S95, and S97, operation logs that include the operation item ID "volume level" are searched for, and Steps S94 and S100 to S102 are performed for content control information that includes the operation item ID "volume level". The same applies to the playback speed and the subtitles.

If a playback mode change operation is performed while the user terminal 2 is controlling playback of content in accordance with the content control information sent by the content request reception process shown in FIG. 12, the content providing server 1 may sent content control information that matches the playback mode change operation in the operation information reception process shown in FIG. 10.

As described above, according to this embodiment, the system controller 14 obtains the user ID of a requesting user. The system controller 14 also retrieves operation logs that correspond to content IDs different from the content ID of requested content from the storage unit 12. The system controller 14 identifies similar users whose operation changes are similar to the requesting user's operation changes, from among reference users different from the requesting user identified by the obtained user ID, based on the retrieved operation logs. Then, the content providing server 14 provides content control information corresponding to a pattern that includes the largest percentage of the operation changes by the similar users, among a plurality of patterns identified from the operation logs. Thus, even when content that is about to be presented to a user has never been presented to the user, content control information that suits the user can be provided.

4. Fourth Embodiment

The following describes a fourth embodiment with reference to FIGS. 13A to 16. In this embodiment, when generating content control information, the content providing server 1 adjusts when the playback of content is to be controlled, based on the details of a moving image.

Figure 13A:
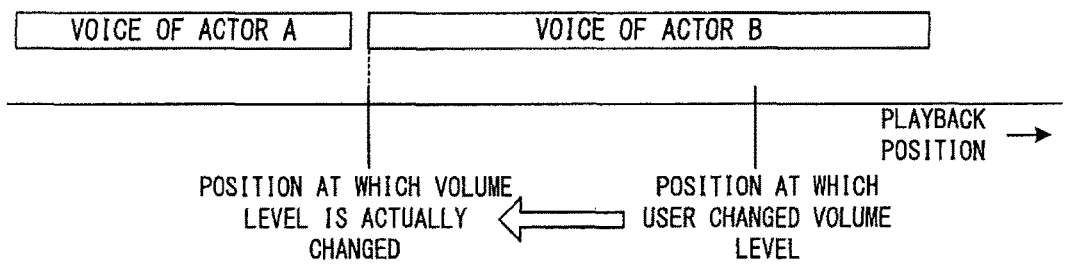
FIG. 13A is a diagram showing an example of adjusting when the volume level is to be changed.

For example, the content providing server 1 may adjust when the volume level is to be changed, based on when the sound contained in the moving image is output. FIG. 13A is a diagram showing an example of adjusting when the volume level is to be changed. For example, assume that in a certain part of a moving image, after a voice of an actor A is output, a voice of an actor B is output. The content providing server 1 identifies a playback position at which the volume level is turned up while the voice of the actor B is being output, based on operation logs. In this case, it is probable that the voice of the actor B, which was low for a user, caused the user to turn up the volume level. Thus, the content providing server 1 may select the playback position at which the output of the voice of the actor B begins as a playback position at which the volume level is to be changed. The same applies to a case where the volume level is turned down. In this case, it is probable that the voice of the actor B, which was loud for a user, caused the user to turn down the volume level.

Figure 13B:
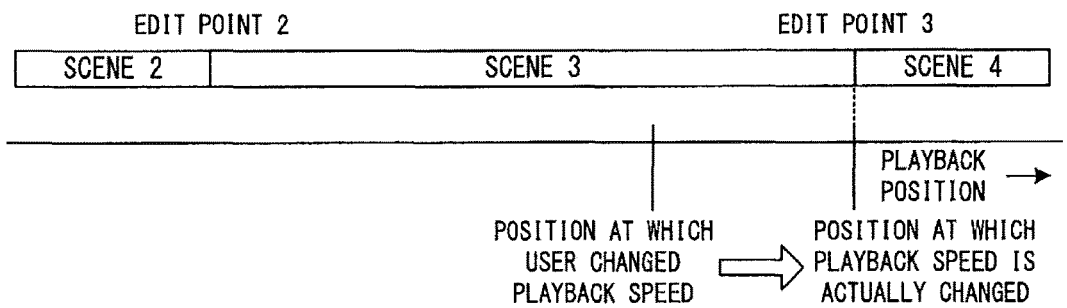
FIG. 13B is a diagram showing an example of adjusting when the playback speed is to be changed.

The content providing server 1 may adjust when the playback speed is to be changed, based on edit points contained in the moving image. Each edit point may be a playback position at which a scene changes. Alternatively, each edit point may be a playback position at which a boundary (chapter) is set by, for example, a creator of the moving image. FIG. 13B is a diagram showing an example of adjusting when the playback speed is to be changed. For example, assume that a moving image contains scenes 1 to 5. The content providing server 1 identifies a playback position at which the playback speed is decreased in the middle of the scene 3, based on operation logs. In this case, a user may have wished to watch the scene 3 carefully or in detail. Alternatively, the user may have decreased the playback speed in preparation for watching the following scene 4. Thus, the content providing server 1 may choose an edit point before or after the identified playback position as a playback position at which the playback speed is to be decreased. Here, if there are edit points both before and after the identified playback position, the content providing server 1 may choose, for example, an edit point near the identified playback position as a playback position at which the playback speed is to be decreased. In the example of FIG. 13B, an edit point 3 that is the boundary between the scenes 3 and 4 is closer to the identified playback position than an edit point 2 that is the boundary between the scenes 2 and 3. Thus, the edit point 3 is chosen as a playback position at which the playback speed is to be decreased. The same applies to a case where the playback speed is increased. In this case, the user may have wished to finish watching the scene 3 earlier or may have wished to finish watching the scene 4 earlier.

For example, a playback speed change operation may be so designed that the moving image is played back at a playback speed (e.g., double speed or half speed) different from its normal playback speed (default speed) while a predetermined operation is being performed and that the playback speed returns to the normal playback speed with the end of the predetermined operation. In this case, the content providing server 1 may choose an edit point before or after the playback position at which the playback speed change operation started as a playback position at which the playback speed is to be changed. Alternatively, the content providing server 1 may choose an edit point before or after the playback position at which the playback speed change operation ended as a playback position at which the playback speed is to be changed.

Figure 13C:
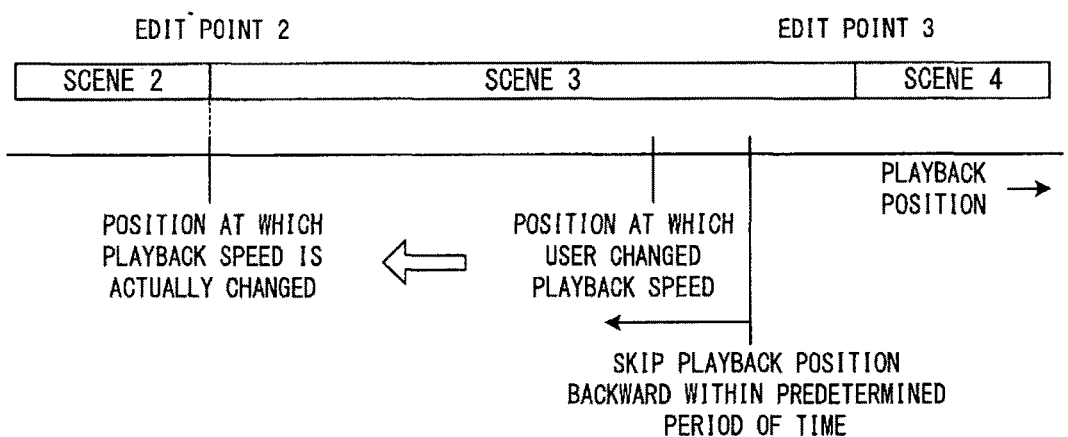
FIG. 13C is a diagram showing an example of adjusting when the playback speed is to be changed.

When an operation to move the playback position is performed within a predetermined period of time after the playback speed is changed, the content providing server 1 may adjust when the playback speed is to be changed based on the details of this operation. Examples of the operation to move the playback position include a skip operation. The skip operation is an operation to move the playback position forward or backward by a predetermined period of time. The forward direction is the future direction. The backward direction is the past direction. The content providing server 1 may choose the edit point in the direction in which the playback position was moved, for example, by the following skip operation, among the edit points before and after the playback position at which the playback speed was changed, as a position at which the playback speed is to be changed. FIG. 13C is a diagram showing an example of adjusting when the playback speed is to be changed. As in FIG. 13B, the content providing server 1 identifies a playback position at which the playback speed is decreased in the middle of the scene 3, based on operation logs. The content providing server 1 determines that an operation to skip backward tends to be performed within a predetermined period of time after the playback speed is decreased. In this case, it is probable that the user performed a backward skip operation to watch the scene 3 again at a slow playback speed. Thus, the edit point 2 is chosen as a playback position at which the playback speed is to be decreased. When an operation to skip forward tends to be performed, it is probable that the user performed the operation to watch the scene 4 at a slow playback speed. In this case, the edit point 3 is chosen as a playback position at which the playback speed is to be decreased.

For example, the content providing server 1 may analyze a moving image in advance. For example, the content providing server 1 may recognize each of the sounds contained in the moving image using a known sound analysis process and may identify the output start position and the output end position of each sound. For example, the content providing server 1 may recognize each of the frame images included in the moving image using a known image analysis process and may identify at which edit points scenes are changed. Then, the control information generator 1 may store the identified information in association with the content ID of the moving image in the content information DB 12b.

Figure 14:
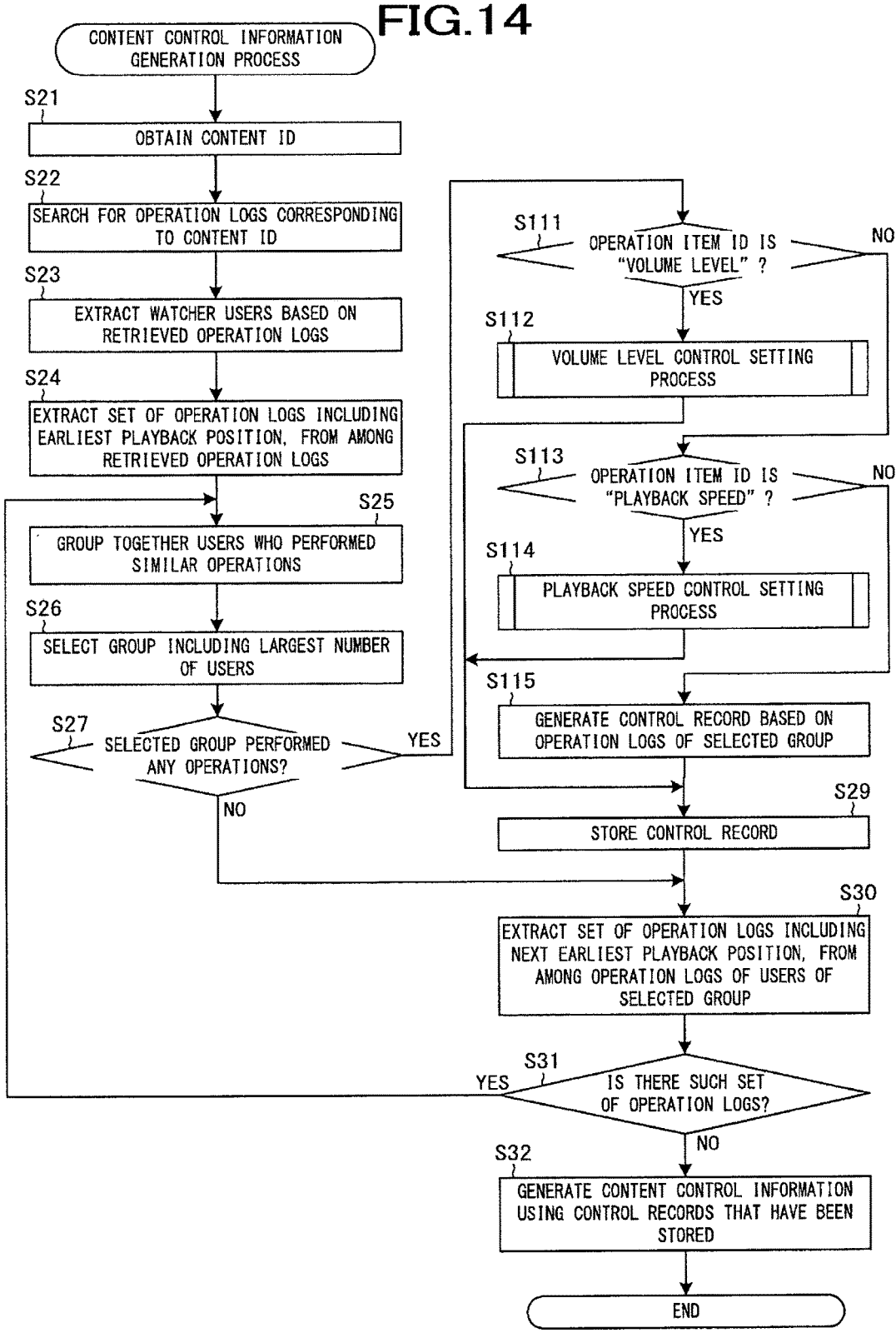
FIG. 14 is a flowchart showing an example process of the content control information generation process in the system controller 14 of the content providing server 1 according to this embodiment.

FIG. 14 is a flowchart showing an example process of the content control information generation process in the system controller 14 of the content providing server 1 according to this embodiment. In FIG. 14, the same components as in FIG. 6 are denoted by the same reference signs.

As shown in FIG. 14, Steps S21 to S27 are performed first. In Step S27, if the control information generator 144 determines that the selected group is a group who performed no operation (NO in Step S27), the process proceeds to Step S30. On the other hand, if the control information generator 144 determines that the selected group is a group who performed some operations (YES in Step S27), the process proceeds to Step S111.

In Step S111, the control information generator 144 determines whether the operation item ID included in the operation logs of the selected group is "volume level". Here, if the control information generator 144 determines that the operation item ID is not "volume level" (NO in Step S111), the process proceeds to Step S113. On the other hand, if the control information generator 144 determines that the operation item ID is "volume level" (YES in Step S111), the process proceeds to Step S112. In Step S112, the control information generator 144 performs a volume level control setting process.

Figure 15:
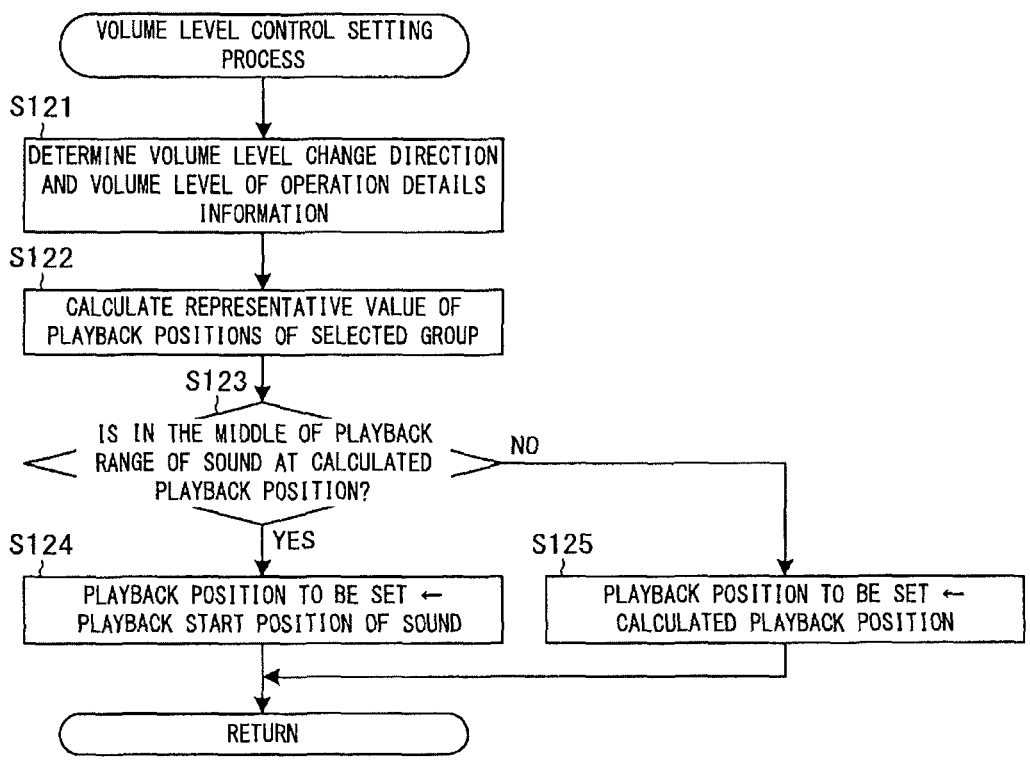
FIG. 15 is a flowchart showing an example process of the content control information generation process in the system controller 14 of the content providing server 1 according to this embodiment.

FIG. 15 is a flowchart showing an example process of the volume level control setting process in the system controller 14 of the content providing server 1 according to this embodiment. As shown in FIG. 15, the control information generator 144 determines a volume level change direction and a volume level of operation details information to be included in a control record, based on the volume level change directions and the volume levels included in the pieces of operation details information of the operation logs of the selected group (Step S121). The volume level change direction and the volume level are determined in the same manner as in Step S28 of FIG. 6.

Next, the control information generator 144 calculates a representative value of the playback positions included in the operation logs of the selected group (Step S122). Subsequently, the control information generator 144 retrieves the output start position and the output end position of each sound contained in the moving image corresponding to the target content ID from the content information DB 12b. Then, the control information generator 144 determines whether the representative value of the playback positions is within the output range from the output start position to the output end position of any of the sounds (Step S123). Here, if the control information generator 144 determines that the representative value of the playback positions is not within the output range from the output start position to the output end position of any of the sounds (NO in Step S123), the process proceeds to Step S125. On the other hand, if the control information generator 144 determines that the representative value of the playback positions is within the output range from the output start position to the output end position of one of the sounds (YES in Step S123), the process proceeds to Step S124.

In Step S124, the control information generator 144 selects the output start position of the output range that includes the representative value of the playback positions, as the playback position to be included in the control record. In Step S125, the control information generator 144 selects the representative value of the playback positions as the playback position to be included in the control record. After Step S124 or S125, the control information generator 144 terminates the volume level control setting process, and the process proceeds to Step S29 as shown in FIG. 14.

In Step S113, the control information generator 144 determines whether the operation item ID included in the operation logs of the selected group is "playback speed". Here, if the control information generator 144 determines that the operation item ID is not "playback speed" (NO in Step S113), the process proceeds to Step S115. On the other hand, if the control information generator 144 determines that the operation item ID is "playback speed" (YES in Step S113), the process proceeds to Step S114. In Step S114, the control information generator 144 performs a playback speed control setting process.

Figure 16:
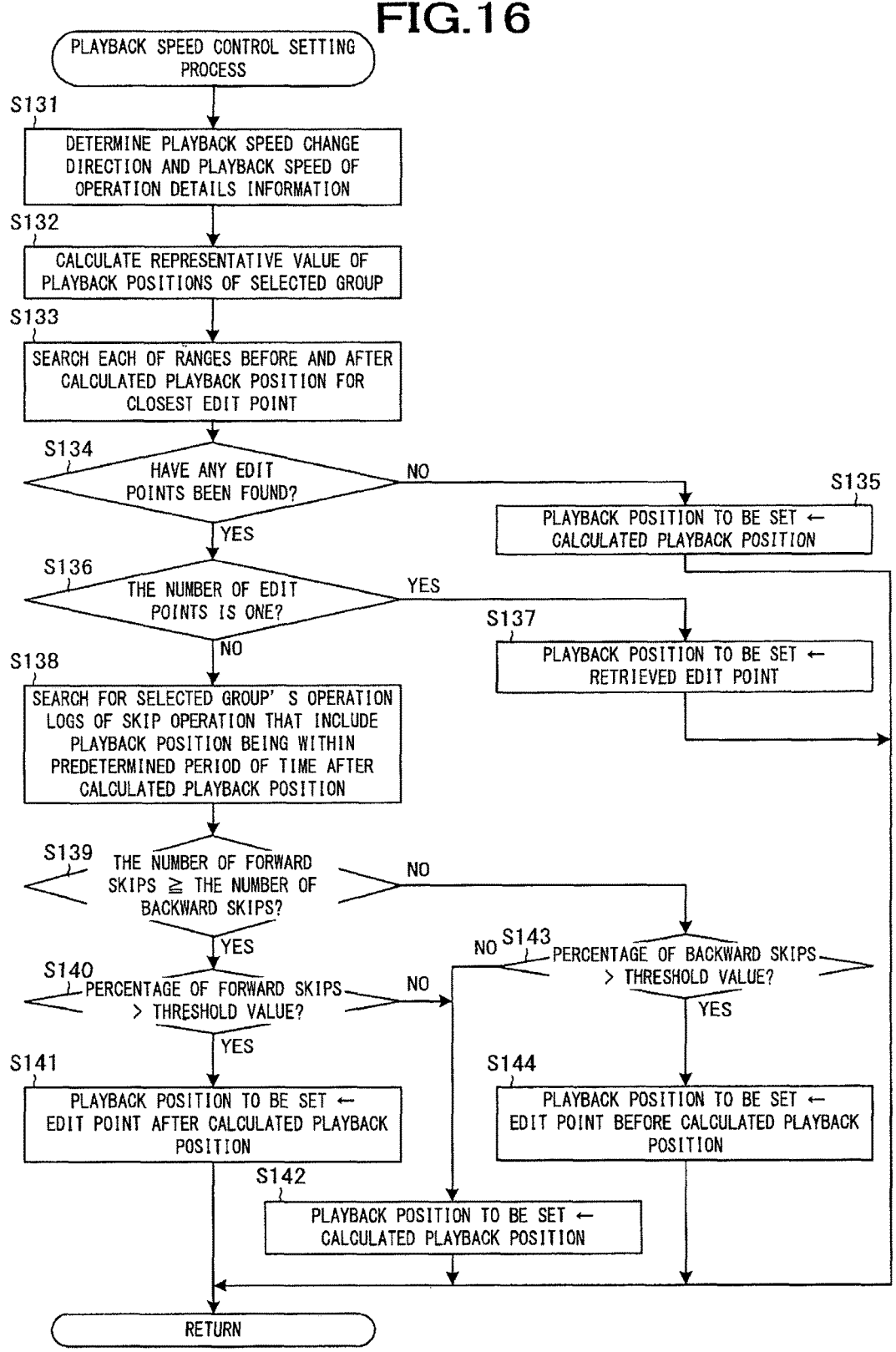
FIG. 16 is a flowchart showing an example process of a playback speed control setting process in the system controller 14 of the content providing server 1 according to this embodiment.

FIG. 16 is a flowchart showing an example process of the playback speed control setting process in the system controller 14 of the content providing server 1 according to this embodiment. As shown in FIG. 16, the control information generator 144 determines a playback speed change direction and a playback speed of operation details information to be included in the control record, based on the playback speed change directions and the playback speeds included in the pieces of operation details information of the operation logs of the selected group (Step S131). The playback speed change direction and the playback speed are determined in the same manner as in Step S28 of FIG. 6.

Next, the control information generator 144 calculates a representative value of the playback positions included in the operation logs of the selected group (Step S132). Subsequently, the control information generator 144 retrieves the playback position of each edit point included in the moving image corresponding to the target content ID from the content information DB 12b. Then, the control information generator 144 searches each of the ranges before and after the representative value of the playback positions for an edit point closest to the representative value of the playback positions (Step S133). Next, the control information generator 144 determines whether any edit points have been retrieved (Step S134). Here, if the control information generator 144 determines that no edit points have been retrieved (NO in Step S134), the process proceeds to Step S135. In Step S135, the control information generator 144 selects the representative value of the playback positions as the playback position to be included in the control record. Then, the control information generator 144 terminates the playback speed control setting process. On the other hand, if the control information generator 144 determines that edit points have been retrieved (YES in Step S134), the process proceeds to Step S136.

In Step S136, the control information generator 144 determines whether only one edit point has been retrieved in either of the ranges before and after the representative value of the playback positions. Here, if the control information generator 144 determines that only one edit point has been retrieved in either of the ranges (YES in Step S136), the process proceeds to Step S137. In Step S137, the control information generator 144 selects the playback position of the retrieved edit point as the playback position to be included in the control record. Then, the control information generator 144 terminates the playback speed control setting process. On the other hand, if the control information generator 144 determines that edit points have been retrieved in both of the ranges before and after the representative value of the playback positions (NO in Step S136), the process proceeds to Step S138.

In Step S138, the control information generator 144 searches the operation history DB 12c for operation logs that include the operation item ID "skip", among the operation logs of the selected group. At this time, the control information generator 144 searches for operation logs that include a playback position being within a predetermined period of time after the representative value of the playback positions. Then, the control information generator 144 determines whether the number of operation logs including the skip direction "forward" is greater than or equal to the number of operation logs including the skip direction "backward", among the retrieved operation logs (Step S139). Here, if the control information generator 144 determines that the number of operation logs including the skip direction "forward" is less than the number of operation logs including the skip direction "backward" (NO in Step S139), the process proceeds to Step S143. On the other hand, if the control information generator 144 determines that the number of operation logs including the skip direction "forward" is greater than or equal to the number of operation logs including the skip direction "backward" (YES in Step S139), the process proceeds to Step S140.

In Step S140, based on the number of operation logs including the skip direction "forward", the control information generator 144 calculates what percentage of the selected users performed a forward skip operation. Then, the control information generator 144 determines whether the calculated percentage is greater than a preset threshold value. Here, if the control information generator 144 determines that the calculated percentage is greater than the threshold value (YES in Step S140), the process proceeds to Step S141. In Step S141, the control information generator 144 selects the playback position of the edit point after the representative value of the playback positions, from among the retrieved edit points, as the playback position to be included in the control record. Then, the control information generator 144 terminates the playback speed control setting process. On the other hand, if the control information generator 144 determines that the calculated percentage is less than or equal to the threshold value (NO in Step S140), the process proceeds to Step S142. In Step S142, the control information generator 144 selects the representative value of the playback positions as the playback position to be included in the control record. Then, the control information generator 144 terminates the playback speed control setting process.

In Step S143, based on the number of operation logs including the skip direction "backward", the control information generator 144 calculates what percentage of the selected users performed a backward skip operation. Then, the control information generator 144 determines whether the calculated percentage is greater than a preset threshold value. Here, if the control information generator 144 determines that the calculated percentage is greater than the threshold value (YES in Step S143), the process proceeds to Step S144. In Step S144, the control information generator 144 selects the playback position of the edit point before the representative value of the playback positions, from among the retrieved edit points, as the playback position to be included in the control record. Then, the control information generator 144 terminates the playback speed control setting process. On the other hand, if the control information generator 144 determines that the calculated percentage is less than or equal to the threshold value (NO in Step S143), the process proceeds to Step S142.

After the control information generator 144 finishes the playback speed control setting process, the process proceeds to Step S29. In Step S115, the control information generator 144 determines a playback position, an operation item ID, and operation details information to be included in the control record for the subtitles. The details of this step are the same as those for the subtitles in Step S28 of FIG. 6. Then, the control information generator 144 causes the process to proceed to Step S29.

The following describes a case where operation changes are identified for each of the items to be operated. After Step S21, the following steps are performed for each of the items. For the volume level, Steps S22 to S27, S112, and S29 to S31 are performed. For the playback speed, Steps S22 to S27, S114, and S29 to S31 are performed. For the subtitles, Steps S22 to S27, S115 and S29 to S31 are performed. After the above steps for each item, the control information generator 144 generates content control information using the control records for each item that have been stored in the RAM 14*c*.

When generating a plurality of pieces of content control information as in the second and third embodiments, the control information generator 144 may adjust a playback position for each piece of content control information as in this embodiment.

As described above, according to this embodiment, the system controller 14 sets a volume level change timing to the output start time of the sound output first, among the sounds output at a volume level changed by a volume level change operation. Consequently, the volume level can be changed at a timing that a user is likely to desire.

The system controller 14 also sets a playback speed change timing to the time corresponding to an edit point before or after the time of a playback speed change operation. Consequently, the playback speed can be changed at a timing that a user is likely to desire.

When a playback position move operation is performed within a predetermined period of time after a playback speed change operation is performed, the system controller 14 may set a playback speed change timing to the time corresponding to the edit point in the direction in which the playback position is moved, among the edit points before and after the time of the playback speed change operation. In this case, the playback speed can be changed at a timing that a user is likely to desire.

In the above embodiments, the present invention is applied to a moving image containing sound. However, the present invention may be applied to a moving image containing no sound or may be applied to a sound.

5. Fifth Embodiment

The following describes a fifth embodiment with reference to FIGS. 16 to 22. In this embodiment, the content providing server 1 provides electronic books as content. The basic configuration and the functional blocks of the information providing system S in this embodiment are essentially the same as those in the first embodiment.

The user terminal 2 displays an electronic book on its screen, for example, by executing an add-on program for the browser or an e-book reader. The electronic book has a plurality of pages. A user can perform an operation to control display of the electronic book by operating the user terminal 2. For example, the user can perform an operation to turn a page. Information, such as sentences, contained in some electronic books may be divided into a plurality of chapters, sections, or the like. Chapters, sections, or the like are referred to as sentence blocks. The sentence blocks are an example of ranges into which content is divided in the present invention. Some electronic books each have a table of contents on predetermined page(s). A table of contents is a list of the titles of sentence blocks contained in such an electronic book. Some tables of contents indicate, for example, page numbers where each sentence block starts. For example, when the user selects the title of any one sentence block on a contents page, the user terminal 2 displays the page on which the selected sentence block starts. Also for example, when the user specifies a page number, the user terminal 2 may display the specified page. An operation to turn a page and an operation to cause a desired page to be displayed are each referred to as a page switching operation.

The user can also perform an operation to select characters in the electronic book. For example, the user can perform an operation to highlight characters. This operation changes the display format of the highlighted characters. For example, the background of the characters may be changed. The color, weight, size, style, or the like of the highlighted characters may be changed. The highlighted characters may be underlined. Such displays are each referred to as highlighting of characters. The user can also select characters and copy the selected characters. For example, the copied characters are used for search or are pasted into another application program.

It can be burdensome for users to perform every such page switching operation when reading an electronic book. For this reason, the content providing server 1 generates content control information for controlling how an electronic book is to be displayed, based on operation logs. Every time a user performs an operation to control display of an electronic book, the user terminal 2 sends operation information to the content providing server 1. The content providing server 1 stores the operation information as an operation log. The content providing server 1 causes the user terminal 2 to automatically switch among the pages of the electronic book in accordance with the content control information.

As an example of how an electronic book is to be displayed, the content providing server 1 may determine in which order its pages are to be displayed. For example, the content providing server 1 identifies in which order the pages were displayed by each user. The display order of the pages indicates how each user's page switching operations have changed. Subsequently, the content providing server 1 identifies in which order the sentence blocks were displayed by each user, based on the display order of the pages and the range of each sentence block. Then, the content providing server 1 identifies the most frequent display order as an order in which the sentence blocks tend to be displayed. Next, the content providing server 1 determines in which order the pages are to be displayed by automatic page switching, based on the order in which the sentence blocks tend to be displayed.

Figure 17:
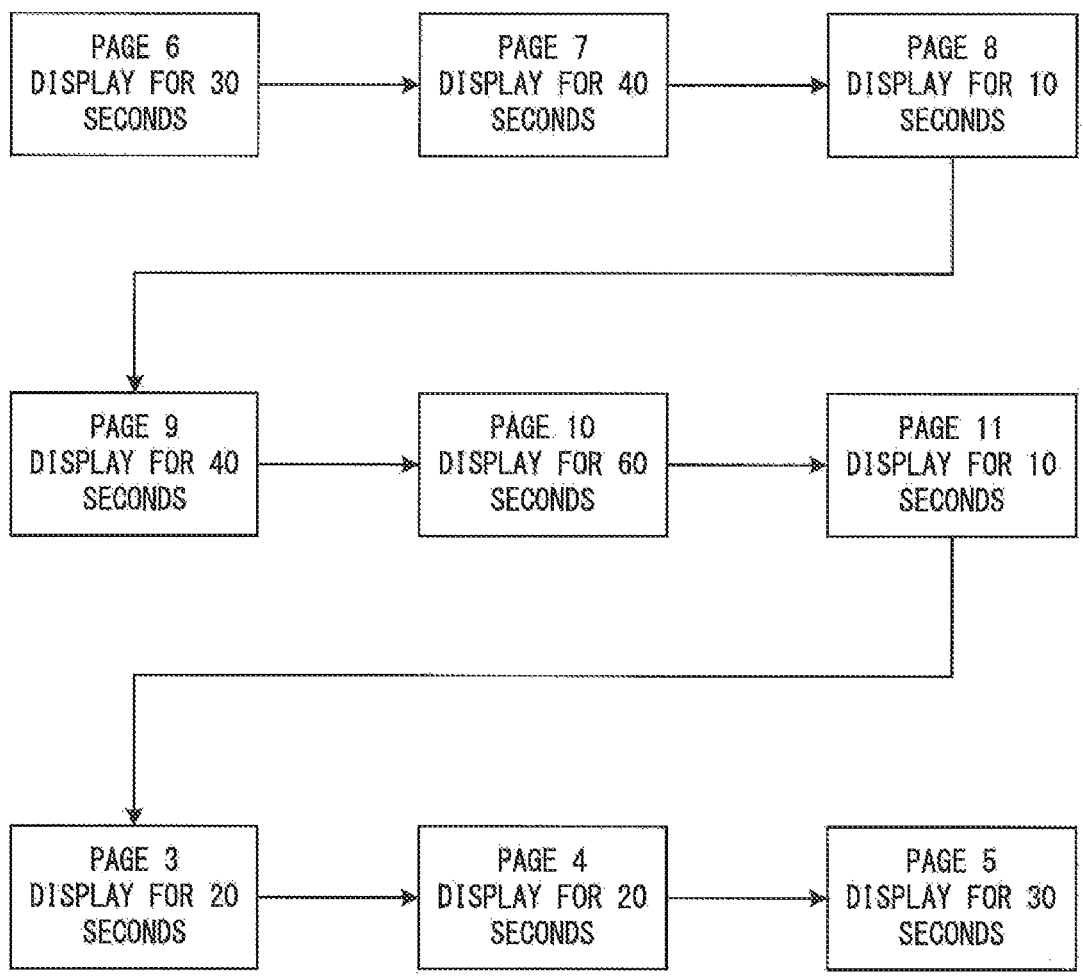
FIG. 17 is a diagram showing an example of determining a display order of pages.

FIG. 17 is a diagram showing an example of determining a display order of pages. For example, assume that electronic books are organized into three chapters. Chapter 1 ranges from page 3 to page 5. Chapter 2 ranges from page 6 to page 8. Chapter 3 ranges from page 9 to page 11. The content providing server 1 determines that chapter 2, chapter 1, and chapter 3 tend to be display in this order, based on operation logs. Thus, the content providing server 1 determines that the switching among the pages is to be automatically performed in the order of pages 6 to 8, pages 9 to 11, and then pages 3 to 5.

The content providing server 1 may identify in which order the pages tend to be displayed, for example, in the same manner as shown in FIG. 3. For example, assume that the page displayed first is a contents page. The content providing server 1 identifies which of the pages read next by the users who read the electronic book was read most. The content providing server 1 identifies which of the pages read third by the users who read the most read page was read most. In this way, the content providing server 1 identifies in which order the pages tend to be displayed. Then, the content providing server 1 identifies in which order the sentence blocks tend to be displayed, based on the order in which the pages tend to be displayed.

As an example of how an electronic book is to be displayed, the content providing server 1 may determine the display time of each page. The display time indicates how long each page remains displayed. The display time also indicates a page switching time interval. The content providing server 1 may determine the display time of each page, for example, based on the operation logs of the users who read the sentence blocks in the order that is the same as the identified order in which the sentence blocks tend to be displayed. Alternatively, the content providing server 1 may determine the display time of each page, based on the operation logs of all the users who read the electronic book. In the example of FIG. 17, by the automatic page switching, page 6 is displayed for 30 seconds, page 7 is then displayed for 40 seconds, and page 8 is then displayed for 10 seconds.

If the display time of a page is short for a user, the page may be switched before the user has read all sentences in the page. In such a case, the user can perform an operation to redisplay the page that was displayed just before. In this case, the content providing server 1 may make the display time of each page longer than its original display time. When lengthening the display time, the more information a page contains, the longer time the content providing server 1 may add to the display time of the page. For example, the more characters a page contains, the longer time the content providing server 1 may add to the display time of the page. Accordingly, the display time can be extended properly.

Figure 18:
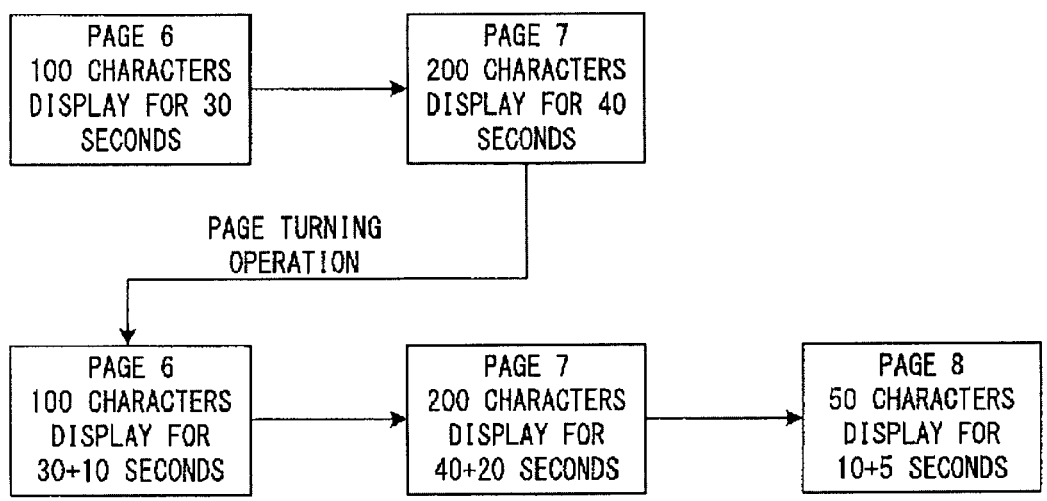
FIG. 18 is a diagram showing an example of changing display times.

FIG. 18 is a diagram showing an example of changing display times. For example, assume that page 6, page 7, and page 8 respectively contain 100 characters, 200 characters, and 50 characters. Also assume that 1 second is added for every 10 characters. While page 7 is being displayed, a user performs an operation to redisplay page 6. Then, 10 seconds, 20 seconds, and 5 seconds are respectively added to the display times of page 6, page 7, and page 8. Consequently, the updated display times of page 6, page 7, and page 8 are respectively 40 seconds, 60 seconds, and 15 seconds.

If the display time of a page is long for a user, the user may finish reading the sentences in the page before the user terminal 2 performs the automatic page switching. In such a case, the user can perform an operation to move on to the next page. In this case, the content providing server 1 may make the display time of each page shorter than its original display time. When shortening the display time, the more information a page contains, the longer time the content providing server 1 may subtract from the display time of the page.

As an example of how an electronic book is to be displayed, the content providing server 1 may control highlighting. For example, the content providing server 1 may determine to cause characters that tend to be selected to be highlighted. At this time, the content providing server 1 may cause the user terminal 2 to highlight the characters, for example, when display of the electronic book starts. Alternatively, for example, the content providing server 1 may cause the user terminal 2 to highlight the characters when a user performs an operation to select any characters after display of the electronic book starts. When the content providing server 1 causes the user terminal 2 to highlight the characters when the user performs an operation to select any characters, the content providing server 1 may identify other users (hereinafter, "reference users") who have selected the same characters as the user has just selected. The content providing server 1 may cause the user terminal 2 to highlight only the characters that the identified reference users tend to select. Consequently, characters unlikely to interest the user are not highlighted, thus preventing highlighted characters from becoming obtrusive to the user.

FIG. 19A is a diagram showing example contents stored in the content information DB 12b. As shown in FIG. 19A, the content information DB 12b stores, for each electronic book, a content ID, electronic book data, contents information, page information, content control information, and other information in association with each other. The electronic book data is data of the electronic book. The contents information includes the page numbers of the start page and the end page of each sentence block. The page information includes the number of characters in each pages.

FIG. 19B is a diagram showing example contents of the content control information. The content control information includes a content ID and one or more page control records. Each page control record is a control record for controlling page switching. The content control information may also include one or more highlighting control records. Each highlighting control record is a control record for controlling highlighting. Content control information for controlling page switching and content control information for controlling highlighting may be stored separately.

FIG. 19C is a diagram showing example contents of the page control record. The page control record includes a display ordinal number, a page number, and a display time. The display ordinal number indicates a place taken by a page in the pages arranged in order of display using the automatic page switching. The page number indicates the page to be displayed. The display time is a duration of time for which the page is to be displayed. The combination of the display ordinal number and the display time is an example of the timing of control of the present invention. The combination of the page number and the display time is an example of the details of control of the present invention. FIG. 19D is a diagram showing example contents of a highlighting control record. The highlighting control record includes a page number, in-page position information, and highlight characters. The page number indicates a page that contains characters to be highlighted. The in-page position information indicates the position in the page of the characters to be highlighted. For example, the in-page position information includes the line and column of the characters to be highlighted, and the number of the characters to be highlighted. The highlight characters are the characters to be highlighted. The combination of the page number and the in-page position information is an example of information indicating selected characters in the present invention.

FIG. 19E is a diagram showing example contents stored in the operation history DB 12c. As shown in FIG. 19, the operation history DB 12c stores a content ID, a user ID, an operation date and time, an operation item ID, and operation details information in association with each other. The operation item ID is set to, for example, "page switching", "redisplay", or "character selection". "Page switching" indicates a page switching operation. "Redisplay" indicates an operation to redisplay a page that was displayed before. "Character selection" indicates an operation to select characters. When the operation item ID is "page switching", the operation details information includes the page number of a page after page switching. When the operation item ID is "redisplay", the operation details information includes the page number of a page that was redisplayed. When the operation item ID is "character selection", the operation details information includes a page number, in-page position information, and selected characters. The selected characters are characters that were selected.

FIG. 20 is a flowchart showing an example process of the content control information generation process in the system controller 14 of the content providing server 1 according to this embodiment.

As shown in FIG. 20, the target content identification unit 142 obtains the content ID of an electronic book for which content control information is to be generated (Step S151). Subsequently, the operation log retriever 143 searches the operation history DB 12c for operation logs that include the obtained content ID (Step S152). At this time, the operation log retriever 143 searches for operation logs that include the operation item ID set to "page switching". Then, the control information generator 144 identifies, for each user, in which order the pages were displayed (Step S153). Specifically, the control information generator 144 divides the retrieved operation logs by user. Next, the control information generator 144 sorts, for each user, the operation logs in ascending order of operation date and time.

Subsequently, the control information generator 144 retrieves the contents information corresponding to the obtained content ID from the content information DB 12b. Based on the retrieved contents information, the control information generator 144 identifies, for each user, in which order the sentence blocks were displayed (Step S154). Specifically, the control information generator 144 identifies which sentence block includes the page identified by the page number included in the first of the sorted operation logs. Then, the control information generator 144 assigns the first in the display order to the identified sentence block. After that, the control information generator 144 obtains the page number from each operation login the order of the sorted operation logs (the display order of the pages) to identify the corresponding sentence block. When a new sentence block is identified, the control information generator 144 assigns the second in the display order to the sentence block. In this way, the control information generator 144 determines the display order of the sentence blocks by identifying each sentence block until no operation logs to obtain page numbers from remain. Then, the control information generator 144 selects the most frequent of the identified display order patterns of the sentence blocks (Step S155).

Next, based on the selected pattern and the contents information, the control information generator 144 determines the display order of the pages (Step S156). Subsequently, the control information generator 144 extracts the operation logs of the users who read the document blocks in the selected pattern, from among the operation logs retrieved in Step S152. The control information generator 144 determines the display time for which each page is to be displayed by the automatic page switching, based on the operation dates and times included in the extracted operation logs (Step S157). The length of time from the operation date and time included in the operation log of the operation to move on to a page to the operation date and time included in the operation log of the operation to move on to the next page is the display time by each user's operations. The control information generator 144 determines, for each page, a representative value of the display times by the users' operations as the display time for which the page is to be displayed by the automatic page switching.

Subsequently, the control information generator 144 generates content control information (Step S158). Specifically, the control information generator 144 generates, for each page, a page control record that includes a display ordinal number indicating its place in the determined display order, its page number, and its determined display time. In association with the content ID obtained in Step S151, the control information generator 144 stores content control information that includes the generated page control records in the content information DB 12b.

Figure 21:
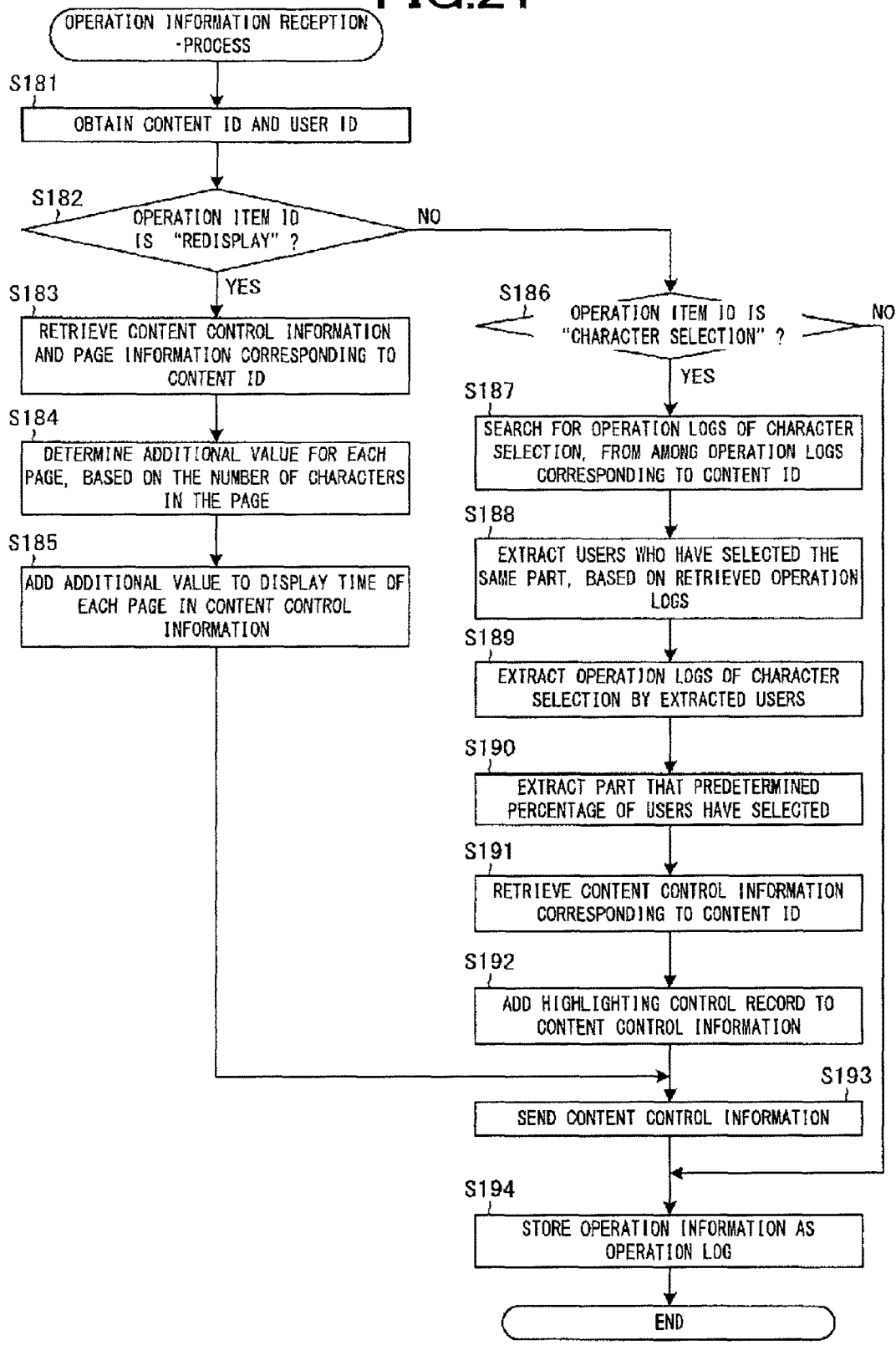
FIG. 21 is a flowchart showing an example process of the operation information reception process in the system controller 14 of the content providing server 1 according to this embodiment.

FIG. 21 is a flowchart showing an example process of an operation information reception process in the system controller 14 of the content providing server 1 according to this embodiment. The operation information reception process is started when the operation information receiver 141 receives operation information sent from the user terminal 2, which is automatically controlling display of an electronic book in accordance with content control information, to the content providing server 1.

As shown in FIG. 21, the operation information receiver 141 obtains the content ID and the user ID from the received operation information (Step S181). Subsequently, the operation information receiver 141 determines whether the operation item ID included in the received operation information is "redisplay" (Step S182). Here, if the operation information receiver 141 determines that the operation item ID is not "redisplay" (NO in Step S182), the process proceeds to Step S186. On the other hand, if the operation information receiver 141 determines that the operation item ID is "redisplay" (YES in Step S182), the process proceeds to Step S183.

In Step S183, the control information generator 144 retrieves the content control information and the page information that correspond to the content ID obtained in Step S181 from the content information DB 12b. Subsequently, the control information generator 144 determines an additional value to be added to the display time of each page (Step S184). For example, the control information generator 144 calculates the additional value by multiplying the number of characters in each page, which is included in the page information, by a predetermined value. Then, the control information generator 144 adds each of the determined additional values to the display time included in the corresponding piece of page control record included in the retrieved content control information (Step S185). Thus, the control information generator 144 updates the retrieved content control information. Next, the control information generator 144 causes the process to proceed to Step S193.

In Step S186, the operation information receiver 141 determines whether the operation item ID included in the received operation information is "character selection". Here, if the operation information receiver 141 determines that the operation item ID is not "character selection" (NO in Step S186), the process proceeds to Step S194. On the other hand, if the operation information receiver 141 determines that the operation item ID is "character selection" (YES in Step S186), the process proceeds to Step S187.

In Step S187, the control information generator 144 searches the operation history DB 12c for operation logs that include the operation item ID "character selection", among the operation logs that include the content ID obtained in Step S181. Subsequently, the control information generator 144 extracts operation logs that include the same page number and the same in-page position information as the received operation information includes, from among the retrieved operation logs. Then, the control information generator 144 extracts the user IDs from the extracted operation logs (Step S188). Thus, the control information generator 144 extracts reference users who have selected the same characters as have just been selected. In this embodiment, reference users who have selected the characters displayed at the same position on the same page are extracted. However, the control information generator 144 may extract reference users who have selected the same characters, regardless of the page number and the in-page position information. In this case, the control information generator 144 uses the selected characters instead of the page number and the in-page position information.

Subsequently, the control information generator 144 extracts operation logs that include the extracted user IDs from among the operation logs retrieved in Step S187 (Step S189). Based on the page numbers and the pieces of in-page position information included in the operation logs extracted in Step S188, the control information generator 144 extracts characters that a predetermined percentage of the extracted reference users have selected before (Step S190). Then, the control information generator 144 retrieves the content control information corresponding to the content ID obtained in Step S181 from the content information DB 12b (Step S191). From the operation logs, the control information generator 144 obtains the page number, the in-page position information, and the selected characters that correspond to the characters that the predetermined percentage of the extracted reference users have selected before. Subsequently, the control information generator 144 generates a highlighting control record that includes the information retrieved from the operation logs as a page number, in-page position information, and highlight characters. Then, the control information generator 144 adds the generated control record to the retrieved content control information (Step S192). Next, the control information generator 144 causes the process to proceed to Step S193.

In Step S193, the information provider 145 sends the updated content control information to the user terminal 2 that has sent the operation information. Subsequently, the operation information receiver 141 stores the received operation information as an operation log in the operation history DB 12c (Step S194). After Step S194, the operation information receiver 141 terminates the operation information reception process.

Figure 22:
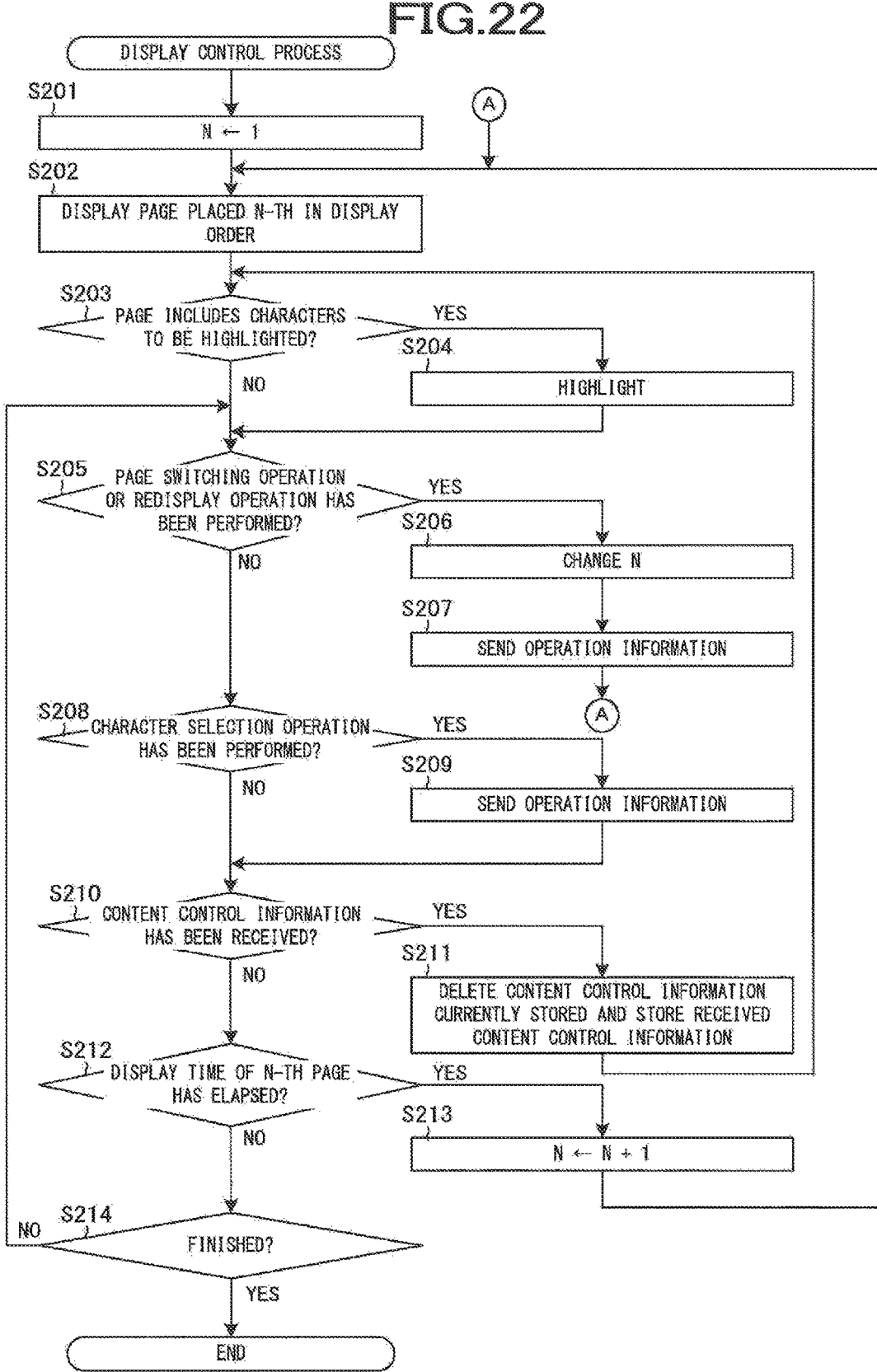
FIG. 22 is a flowchart showing an example process of a display control process in the user terminal 2 according to this embodiment.

FIG. 22 is a flowchart showing an example process of a display control process in the user terminal 2 according to this embodiment. The display control process is started when the user terminal 2 receives electronic book data and content control information from the content providing server 1 after sending a content request to the content providing server 1. The display control process is executed by the CPU that the user terminal 2 includes.

As shown in FIG. 22, the user terminal 2 stores the received content control information in the memory that the user terminal 2 includes. Subsequently, the user terminal 2 sets a place N in a display order to 1 (Step S201). Then, the user terminal 2 obtains the page number that is placed N-th in the display order, from the page control records in the content control information. Based on the electronic book data, the user terminal 2 displays the page identified by the obtained page number on its screen (Step S202).

Next, the user terminal 2 determines whether the page placed N-th in the display order includes characters to be highlighted (Step S203). If the content control information includes no highlighting control records, the user terminal 2 determines that the page placed N-th in the display order includes no characters to be highlighted. Also, if the highlighting control records included in the content control information include no page number placed N-th in the display order, the user terminal 2 determines that the page placed N-th in the display order includes no characters to be highlighted. If the user terminal 2 determines that no characters to be highlighted are included (NO in Step S203), the process proceeds to Step S205. On the other hand, if the highlighting control records included in the content control information include the page number placed N-th in the display order, the user terminal 2 determines that the page placed N-th in the display order includes characters to be highlighted. In this case, the user terminal 2 causes the process to proceed to Step S204.

In Step S204, the user terminal 2 performs highlighting. Specifically, the user terminal 2 identifies the on-screen position of the characters to be highlighted, based on the page number and the in-page position information included in the highlighting control record that includes the page number placed N-th in the display order. Then, the user terminal 2 changes, for example, the background color of the characters at the identified position. After the user terminal 2 finishes this step, the process proceeds to Step S205. The user terminal 2 may change the display format of characters that are the same as the highlight characters included in the highlighting control record, regardless of the page number and the in-page position information.

In Step S205, the user terminal 2 determines whether a page switching operation or a redisplay operation has been performed. Here, if the user terminal 2 determines that neither a page switching operation nor a redisplay operation has been performed (NO in Step S205), the process proceeds to Step S208. On the other hand, if the user terminal 2 determines that a page switching operation or a redisplay operation has been performed (YES in Step S205), the process proceeds to Step S206. In Step S206, the user terminal 2 changes the place N in the display order, in accordance with details of the operation. Subsequently, the user terminal 2 generates operation information based on the details of the operation. Then, the user terminal 2 sends the generated operation information to the content providing server 1 (Step S207). Next, the user terminal 2 causes the process to proceed to Step S202.

In Step S208, the user terminal 2 determines whether a character selection operation has been performed. Here, if the user terminal 2 determines that no character selection operation has been performed (NO in Step S208), the process proceeds to Step S210. On the other hand, if the user terminal 2 determines that a character selection operation has been performed (YES in Step S208), the process proceeds to Step S209. In Step S209, the user terminal 2 generates operation information based on the details of the operation. Then, the user terminal 2 sends the generated operation information to the content providing server 1. Next, the user terminal 2 causes the process to proceed to Step S210.

In Step S210, the user terminal 2 determines whether new content control information has been received from the content providing server 1. Here, if the user terminal 2 determines that no content control information has been received (NO in Step S210), the process proceeds to Step S212. On the other hand, if the user terminal 2 determines that content control information has been received (YES in Step S210), the process proceeds to Step S211. In Step S211, the user terminal 2 deletes the content control information that is currently stored in the memory and stores the received content control information in the memory. Next, the user terminal 2 causes the process to proceed to Step S203.

In Step S212, the user terminal 2 calculates how much time has elapsed since display of the page placed N-th in the display order started. Then, the user terminal 2 determines whether the elapsed time is greater than or equal to the display time included in the page control record for the page placed N-th in the display order. Here, if the user terminal 2 determines that the elapsed time is less than the display time (NO in Step S212), the process proceeds to Step S214. On the other hand, if the user terminal 2 determines that the elapsed time is greater than or equal to the display time (YES in Step S212), the process proceeds to Step S213. In Step S213, the user terminal 2 adds 1 to the place N in the display order. Next, the user terminal 2 causes the process to proceed to Step S202.

In Step S214, the user terminal 2 determines whether an operation to end the display of the electronic book has been performed. Here, if the user terminal 2 determines that no operation to end the display of the electronic book has been performed (NO in Step S214), the process proceeds to Step S205. On the other hand, if the user terminal 2 determines that an operation to end the display of the electronic book has been performed (YES in Step S214), the user terminal 2 terminates the display control process.

As in the second and third embodiments, the content providing server 1 may generate a plurality of pieces of content control information for one electronic book and may provide one of the pieces of content control information. When a user performs an operation such as page switching while the user terminal 2 is performing the automatic page switching in accordance with content control information, the content providing server 1 may provide content control information that matches the user operation, as in the second embodiment.

As described above, according to this embodiment, the system controller 14 sets the display time of each page that is used for the automatic page switching and generates content control information, in accordance with how long each page tends to be displayed. Consequently, each page can remain displayed for a duration of time appropriate for a user to view the page.

When an operation to redisplay a page that was displayed before is performed while page switching is being performed in accordance with the timings included in the provided content control information, the system controller 14 may make the display times longer than the display times included in the content control information provided before. Then, the system controller 14 may provide the content control information that includes the updated display times. In this case, if a user who actually views content finds it early to switch a page, the page can be switched at a timing that suits the user.

In changing a page switching timing, the more information a page contains, the longer time the system controller 14 may add to the display time of the page. In this case, depending on the amount of information contained in a page, the timing of switching the page can be delayed properly.

In addition, the system controller 14 identifies in which order a plurality of sentence blocks, into which content is divided by referring to a table of contents, tend to be displayed, based on in which order pages tend to be displayed, and then generates content control information that indicates in which order the pages are to be displayed, in accordance with the identified tendency. Consequently, a plurality of sentence blocks can be displayed in an order that a user desires.

The system controller 14 also generates content control information for changing the display format of characters that tend to be selected. Consequently, characters that tend to be selected can become more visible.

When an operation to select any characters contained in content, the system controller 14 may obtain operation information that includes information indicating the selected characters. The system controller 14 may also obtain the user IDs corresponding to operation logs that include the obtained information. The system controller 14 may also obtain the operation logs corresponding to the obtained user IDs, from among the operation logs corresponding to an obtained content ID. Based on the obtained operation logs, the system controller 14 may identify which characters tend to be selected. In this case, characters that are likely to interest a user can be noticed more easily.

In the above embodiment, the present invention is applied to an electronic book. However, the present invention can be applied to content that has a plurality of pages. In this case, the content may or may not contain characters.

The above embodiments describe a plurality of items to be operated. However, the number of items to be operated may be only one.

In the above embodiments, an information processing apparatus according to the present invention is a server device that distributes content. However, the information processing apparatus according to the present invention need not have the function of distributing content, and instead a device different from the information processing apparatus according to the present invention may distribute content. Alternatively, the user terminal 2 may prestore content or may read content from a recording medium.

REFERENCE SIGNS LIST 1 content providing server
2 user terminal
11 communication unit
12 storage unit
12a member information DB
12b content information DB
12c operation history DB
13 input/output interface
14 system controller
14a CPU
14b ROM
14c RAM
15 system bus
141 operation information receiver
142 target content identification unit 143 operation log retriever
144 control information generator
145 control information provider
NW network
S information providing system

The invention claimed is:

1. An information processing apparatus comprising:
at least one memory configured to store computer program code; and
at least one processor configured to access said at least one memory, read said computer program code, and operate as instructed by said computer program code, said computer program code including:
content identification information obtaining code configured to cause at least one of said at least one processor to obtain content identification information for identifying a content to be presented with respect to a user identifier C;
log retrieval code configured to cause at least one of said at least one processor to retrieve, from a storage that stores operation logs each of which is associated with content identification information for identifying a presented content and includes both a time at which an operation to control presentation of the presented content was performed during presentation of the presented content and details of the operation, operation logs corresponding to the obtained content identification information;
generating code configured to cause at least one of said at least one processor to generate control information for controlling how to present the content indicated by the obtained content identification information, in accordance with a tendency of operation changes that is identified based on the retrieved operation logs, the control information including details of control and a timing of the control, wherein
based on a frequency of appearance of each of a plurality of patterns included in the operation changes, the generating code causes at least one of said at least one processor to select at least one of the plurality of patterns and generate the control information in accordance with the selected at least one pattern, wherein a first pattern of the plurality of patterns includes a first control at a first position and Wherein the first control is associated with a first plurality of user identifiers, and wherein the first pattern of the plurality of patterns further includes a second control at a second position associated with a second plurality of user identifiers, and
providing code configured to cause at least one of said at least one processor to provide the generated control information, wherein:
the operation logs include an operation log associated with a user identifier A and an operation log associated with a user identifier B, but do not include an operation log associated with the user identifier C,
the user identifier C is different than the user identifier A, and
the user identifier C is different than the user identifier B.

2. The information processing apparatus according to claim 1, wherein
the generating code causes at least one of said at least one processor to generate the control information in accordance with a first pattern among the plurality of patterns and the providing code causes at least one of said at least one processor to provide the generated control information,
the computer program code further comprises operation information obtaining code configured to cause at least one of said at least one processor to obtain, when an operation to control presentation of the content is performed while presentation of the content is being automatically controlled in accordance with the provided control information generated in accordance with the first pattern, operation information including both a time at which the operation is performed and details of the operation,
the generating code causes at least one of said at least one processor to further generate control information in accordance with a second pattern that matches the operation indicated by the obtained operation information and is different from the first pattern, among the plurality of patterns, and
the providing code causes at least one of said at least one processor to provide the further generated control information.

3. The information processing apparatus according to claim 1, further comprising:
user identification information obtaining code configured to cause at least one of said at least one processor to obtain user identification information for identifying a first user to whom the content indicated by the obtained content identification information is presented;
second log retrieval code configured to cause at least one of said at least one processor to retrieve, from the storage that stores the operation logs each of which is associated with the content identification information and user identification information identifying a user who performed the operation to control presentation of the presented content, operation logs corresponding to content identification information different from the obtained content identification information; and
identifying code configured to cause at least one of said at least one processor to identify second users whose operation changes are similar to operation changes of the first user, from among users different from the first user identified by the obtained user identification information, based on the operation logs retrieved,
wherein the generating code causes at least one of said at least one processor to generate the control information in accordance with a pattern including the largest percentage of operation changes by the identified second users, among the plurality of the patterns.

4. The information processing apparatus according to claim 1, wherein
the log retrieval code causes at least one of said at least one processor to retrieve the operation logs each of which includes a time of a playback speed change operation on the presented content to be played back, and
the generating code causes at least one of said at least one processor to set a playback speed change timing to a time corresponding to an edit point before or after a time when playback speed change operations tend to be performed.

5. The information processing apparatus according to claim 4, wherein
the log retrieval code causes at least one of said at least one processor to further retrieve the operation logs each of which includes both a time of a temporal playback position move operation on the presented content and information indicating in which direction a playback position was moved, and when playback position move operations tend to be performed within a predetermined period of time after the playback speed change operations tend to be performed, the generating code causes at least one of said at least one processor to set the playback speed change timing to a time corresponding to an edit point in a direction in which a playback position is moved, among edit points before and after the time when the playback speed change operations tend to be performed.

6. The information processing apparatus according to claim 1, wherein
the log retrieval code causes at least one of said at least one processor to retrieve the operation logs each of which includes both a time at which a page switching operation on the presented content having a plurality of pages was performed and information indicating a page that was displayed, and
the generating code causes at least one of said at least one processor to set a page switching timing for each page, in accordance with a tendency of page switching time intervals.

7. The information processing apparatus according to claim 6, wherein
when an operation to redisplay a page that was displayed before is performed while page switching is being performed in accordance with timings included in the provided control information, the generating code causes at least one of said at least one processor to change a page switching timing so that a page switching time interval becomes longer than a time interval indicated by timings included in the control information provided before, and
the providing code causes at least one of said at least one processor to further provide control information including a changed page switching timing.

8. The information processing apparatus according to claim 7, wherein
when the generating code causes at least one of said at least one processor to change a page switching timing, the more information a page contains, the longer time the generating code causes at least one of said at least one processor to add to the time interval.

9. The information processing apparatus according to claim 1, wherein
the log retrieval code causes at least one of said at least one processor to retrieve the operation logs that include information indicating which pages in the content having both a plurality of pages and a table of contents were displayed and that include time at which each page was displayed, and
the generating code causes at least one of said at least one processor to identify in which order a plurality of ranges, into which the content is divided by referring to the table of contents, tend to be displayed, based on a tendency of a display order of the plurality of pages, and generate the control information indicating an order in which the plurality of pages are to be displayed, in accordance with the identified tendency of display order of the plurality of ranges.

10. The information processing apparatus according to claim 1, wherein
the log retrieval code causes at least one of said at least one processor to retrieve the operation logs each of which includes information indicating characters selected by a user in the presented content containing a plurality of characters, and
the generating code causes at least one of said at least one processor to generate the control information for changing a display format of characters that tend to be selected.

11. The information processing apparatus according to claim 10, further comprising:
character obtaining code configured to cause at least one of said at least one processor to obtain, when an operation to select any characters contained in content, information indicating the selected characters; and
selecting user identification information retrieval code configured to cause at least one of said at least one processor to retrieve, from the storage that stores the operation logs, each of which is associated with the content identification information, and user identification information identifying a user who performed the operation to select characters included in the presented content, user identification information corresponding to operation logs including information obtained,
wherein the log retrieval code causes at least one of said at least one processor to retrieve the operation logs corresponding to the obtained user identification information, among the operation logs corresponding to the obtained content identification information.

12. The information processing apparatus according to claim claim 1, wherein the first plurality of user identifiers includes the user identifier A and includes the user identifier B, and wherein the second plurality user identifiers includes the user identifier A and does not include the user identifier B.

13. The information processing apparatus according to claim 1, wherein a second pattern is associated with a second plurality of user identifiers, wherein the first plurality of user identifiers form a majority with respect to the first plurality of user identifiers and the second plurality of user identifiers taken together.

14. An information processing apparatus comprising:
at least one memory configured to store computer program code; and
at least one processor configured to access said at least one memory, read said computer program code, and operate as instructed by said computer program code, said computer program code including;
content identification information obtaining code configured to cause at least one of said at least one processor to obtain content identification information for identifying a content to be presented with respect to a user identifier C;
log retrieval code configured to cause at least one of said at least one processor to retrieve, from a storage that stores operation logs each of which is associated with content identification information for identifying a presented content and includes both a time at which an operation to control presentation of the presented content was performed during presentation of the presented content and details of the operation, operation logs corresponding to the obtained content identification information;
generating code configured to cause at least one of said at least one processor to generate control information for controlling how to present the content indicated by the obtained content identification information, in accordance with a tendency of operation changes that is identified based on the retrieved operation logs, the control information including details of control and a timing of the control, wherein based on a frequency of appearance of each of a plurality of patterns included in the operation changes, the generating code causes at least one of said at least one processor to select at least one of the plurality of patterns and generate the control information in accordance with the selected at least one pattern, and providing code configured to cause at least one of said at least one processor to provide the generated control information, wherein:

the operation logs include an operation log associated with a user identifier A and an operation log associated with a user identifier B, but do not include an operation log associated with the user identifier C, the user identifier C is different than the user identifier A, and the user identifier C is different than the user identifier B, and wherein the generated control information corresponds to a quasi-majority of user identifiers, wherein the quasi-majority of user identifiers reflects a first number of user identifiers which exceeds a pre-determined reference level with respect to a second number of user identifiers, and wherein the second number of user identifiers corresponds to a majority of the operation logs.

15. The information processing apparatus according to claim 14, wherein the generated control information matches a presentation mode change operation associated with the user identifier C, wherein the control information is different from a previous control information in order to avoid control information that may not suit preferences of the user identifier by user identifier C.

16. The information processing apparatus according to claim 1, wherein when the content contains a plurality of sounds including a first sound starting at a first time and lasting for a first time interval and a second sound starting at a second time and lasting for a second time interval, the operation to control presentation includes an operation to change a volume of the second sound during the presentation of the content, and the generating code is further configured to cause at least one of said at least one processor to determine based on the at least one retrieved operation log that the volume of the second sound tends to be changed during the second time interval, and automatically set a volume change time to the second time.

17. A method, the method performed by at least one processor, the method comprising:

obtaining content identification information for identifying a content to be presented with respect to a user identifier C;

retrieving, from a storage that stores operation logs each of which is associated with content identification information for identifying a presented content and includes both a time at which an operation to control presentation of the presented content was performed during presentation of the presented content and details of the operation, operation logs corresponding to the obtained content identification information;

generating control information for controlling how to present the content indicated by the obtained content identification information, in accordance with a tendency of operation changes that is identified based on the retrieved operation logs, the control information including details of control and a timing of the control, wherein based on a frequency of appearance of each of a plurality of patterns included in the operation changes, the generating further comprises selecting at least one of the plurality of patterns and generating the control information in accordance with the selected at least one pattern, wherein a first pattern of the plurality of patterns includes a first control at a first position and wherein the first control is associated with a first plurality of user identifiers, and wherein the first pattern of the plurality of patterns further includes a second control at a second position associated with a second plurality of user identifiers; and providing the generated control information, wherein the operation logs include an operation log associated with a user identifier A and an operation log associated with a user identifier B, but do not include an operation log associated with the user identifier C, the user identifier C is different than the user identifier A, and the user identifier C is different than the user identifier B.

18. A method, the method performed by at least one processor, the method comprising:

obtaining content identification information for identifying a content to be presented with respect to a user identifier C;

retrieving, from a storage that stores operation logs each of which is associated with content identification information for identifying a presented content and includes both a time at which an operation to control presentation of the presented content was performed during presentation of the presented content and details of the operation, operation logs corresponding to the obtained content identification information;

generating control information for controlling how to present the content indicated by the obtained content identification information, in accordance with a tendency of operation changes that is identified based on the retrieved operation logs, the control information including details of control and a timing of the control, wherein, based on a frequency of appearance of each of a plurality of patterns included in the operation changes, the generating further comprises selecting at least one of the plurality of patterns and generating the control information in accordance with the selected at least one pattern; and providing the generated control information, wherein the operation logs include an operation log associated with a user identifier A and an operation log associated with a user identifier B, but do not include an operation log associated with the user identifier C, the user identifier C is different than the user identifier A, and the user identifier C is different than the user identifier B, and wherein the generated control information corresponds to a quasi-majority of user identifiers, wherein the quasi-majority of user identifiers reflects a first number of user identifiers which exceeds a pre-determined reference level with respect to a second number of user identifiers, and wherein the second number of user identifiers corresponds to a majority of the operation logs.

* * * * *